(12) United States Patent  (10) Patent No.: US 8,745,758 B2
Cholas et al.  (45) Date of Patent: Jun. 3, 2014

(54) APPARATUS AND METHODS FOR DEVICE AUTHORIZATION IN A PREMISES NETWORK

(75) Inventors: Chris Cholas, Frederick, CO (US);
David Bell, Broomfield, CO (US);
George W. Sarosi, Niwot, CO (US);
Jeffrey P. Markley, Superior, CO (US)

(73) Assignee: Time Warner Cable Enterprises LLC, New York, NY (US)

( * ) Notice: Subject to any disclaimer, the term of this patent is extended or adjusted under 35 U.S.C. 154(b) by 481 days.

(21) Appl. No.: 12/611,006

(22) Filed: Nov. 2, 2009

(65) Prior Publication Data

US 2011/0107436 A1     May 5, 2011

(51) Int. Cl.
*G06F 17/30* (2006.01)
*H04N 7/16* (2011.01)
*G06F 15/16* (2006.01)
*H04L 29/06* (2006.01)
*H04N 7/167* (2011.01)
*H04N 7/173* (2011.01)
*H04W 4/00* (2009.01)

(52) U.S. Cl.
USPC ............... 726/29; 726/3; 725/31; 725/114; 370/338

(58) Field of Classification Search
USPC ............ 713/168–174, 182–186, 202; 709/217–219, 225, 229; 726/2–8; 725/114–117, 144–148
See application file for complete search history.

(56) References Cited

U.S. PATENT DOCUMENTS

| 7,602,820 | B2 | 10/2009 | Helms |
| 7,603,529 | B1 | 10/2009 | MacHardy |
| 7,757,261 | B2 | 7/2010 | Addington et al. |
| 7,763,360 | B2 | 7/2010 | Paul |
| 7,908,626 | B2 | 3/2011 | Williamson |
| 7,954,131 | B2 | 5/2011 | Cholas |
| 8,078,696 | B2 | 12/2011 | LaJoie et al. |
| 2003/0018919 | A1 | 1/2003 | Arab et al. |
| 2003/0055962 | A1 | 3/2003 | Freund et al. |
| 2003/0056217 | A1 | 3/2003 | Brooks |
| 2006/0130113 | A1 | 6/2006 | Carlucci |
| 2007/0005765 | A1 | 1/2007 | Lamb et al. |
| 2007/0022459 | A1 | 1/2007 | Gaebel, Jr. et al. |
| 2007/0217436 | A1 | 9/2007 | Markley |
| 2007/0220279 | A1 | 9/2007 | Northcutt et al. |

(Continued)

OTHER PUBLICATIONS

U.S. Appl. No. 61/256,903, filed Oct. 30, 2009, LaJoie.

(Continued)

*Primary Examiner* — Evans Desrosiers
(74) *Attorney, Agent, or Firm* — Gazdzinski & Associates, PC

(57) ABSTRACT

Apparatus and methods for enabling protected premises networking capabilities. In one embodiment, a white list of devices authorized to access a premises network and a black list of device not authorized to access a premises network are utilized. The black and white lists may be stored at a database in communication with an authorization manager or may be stored at the manager itself. When a client device is connected to a premise, the manager determines, based on the premises and/or device identity, whether the device is entitled to access. The authorization manager makes this determination based on whether the device is on the white or black list. If the device is on neither list, the manager may add the device to the white list upon appropriate verification. The manager may also facilitate removal of a device from the white list to the black list upon request or automatically.

24 Claims, 18 Drawing Sheets

(56) References Cited

U.S. PATENT DOCUMENTS

| | | |
|---|---|---|
| 2008/0013612 A1 | 1/2008 | Miller et al. |
| 2008/0076412 A1 | 3/2008 | Khetawat et al. |
| 2008/0316960 A1 | 12/2008 | Daige et al. |
| 2009/0024550 A1 | 1/2009 | Wynn et al. |
| 2009/0059933 A1 | 3/2009 | Huang et al. |
| 2009/0140035 A1 | 6/2009 | Miller |
| 2009/0288145 A1* | 11/2009 | Huber et al. .................. 726/3 |
| 2010/0287585 A1* | 11/2010 | Frondal et al. .................. 725/31 |
| 2010/0312826 A1 | 12/2010 | Sarosi et al. |
| 2010/0313225 A1 | 12/2010 | Cholas et al. |
| 2011/0103374 A1 | 5/2011 | LaJoie et al. |
| 2011/0107436 A1 | 5/2011 | Cholas et al. |
| 2011/0116442 A1 | 5/2011 | Caldwell et al. |

OTHER PUBLICATIONS

U.S. Appl. No. 60/377,963, filed May 3, 2002, Benya.

* cited by examiner

APPARATUS AND METHODS FOR DEVICE AUTHORIZATION IN A PREMISES NETWORK

RELATED APPLICATIONS

This application is related to co-owned and co-pending U.S. application Ser. No. 12/611,041 filed contemporaneously herewith on Nov. 2, 2009 and entitled "Protected Premises Network Apparatus and Methods", incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of content and/or data delivery over a network. More particularly, the present invention is related to apparatus and methods for ensuring the distribution of programming content, media, data and other information services to only authorized devices within user premises (e.g., residence, enterprise, etc.) network.

2. Description of Related Technology

Recent advances in digital information processing have made a range of services and functions available for delivery to consumers at their premises for very reasonable prices or subscription fees. These services and functions include digital broadcast programming (movies, etc.), digital video-on-demand (VOD), personal video recorder (PVR), Internet Protocol television (IPTV), digital media playback and recording, as well high speed internet access and IP-based telephony (e.g., VoIP). Other services available to network users include access to and recording of digital music (e.g., MP3 files), as well local area networking (including wire-line and wireless local area networks) for distributing these services throughout the user's premises, and beyond.

Currently, in the context of content delivery networks such as cable and satellite networks, many of these services are provided and delivered to the user via a variety of different equipment environments including, inter alia, cable modems and computers, set-top boxes, digital video recorders (DVRs), PSTNs, cellular telephones/smartphones, PDAs, and portable digital music devices such as the Apple iPod™. Additionally, the services associated with such technology are typically provided by multiple vendors including e.g., a cable or satellite service provider (e.g., MSO), cellular service provider (CSP), wireless service provider (WSP), VoIP service provider, music download service, Internet service provider (ISP), PSTN telephone service, etc. Many of the aforementioned services may be provided to users using Internet protocol (IP) based mechanisms. These mechanisms may comply with open consumer electronics (CE) industry standards such as, inter alia, Universal Plug and Play (UpnP), Consumer Electronics Association (CEA) 2014, Digital Living Network Alliance (DLNA), and Multimedia over Coax Alliance (MoCA), which allow devices to connect seamlessly and to simplify the implementation of networks in a premises (data sharing, communications, and entertainment).

Within a content delivery network, there has been an appreciable increase in the use of devices having IP based content and data delivery capabilities, including retail devices or devices which are not particularly owned or managed by an MSO delivering the content and/or data. Still further, IP based delivery mechanisms are often susceptible to non-consumer devices or nomadic IP devices surreptitiously gaining access to services.

Current methods for providing secure content delivery are only available for devices which have been leased to the user from the network operator (e.g., MSO). There are currently no mechanisms for controlling access to content at customer retail devices via a premises network (e.g., limiting access only to the devices of authorized subscribers of the MSO, whether leased or retail devices).

Accordingly, there is a need for methods and apparatus to protect video and data services on a premises network from being accessed by unauthorized devices, whether they be MSO-provided or leased, or retail. Specifically, methods and apparatus are needed for ensuring that only authorized devices gain access to services, and that unauthorized devices are detected quickly and efficiently and prevented. Exemplary methods and apparatus would additionally provide a mechanism to revoke a device's ability to access content.

SUMMARY OF THE INVENTION

The present invention satisfies the foregoing needs by providing, inter alia, improved apparatus and methods for device authorization in a premises network.

In a first aspect of the invention, an apparatus for limiting access to a premises network is disclosed. In one embodiment, the apparatus comprises at least one first interface, at least one second interface, a storage apparatus, and a processor configured to run one or more computer applications thereon. At least one of the one or more computer applications comprises an application for authorizing a plurality of client devices to access the premises network and at least one other one of the one or more computer applications comprises an application for revoking access to the premises network by identified ones of the plurality of client devices.

In one variant, the apparatus comprises a headend entity of the content delivery network, the first interface comprises an interface to the content delivery network by which the apparatus may interface with the plurality of client devices, and the second interface comprises an interface to a plurality of apparatus at a headend of the content delivery network.

In another variant, the plurality of client devices are authorized by placing a unique identifier associated with individual ones of the plurality of client devices into a list of authorized devices. The unique identifier may comprise at least one of a MAC address or an IP address. The list of authorized devices may further comprise an identifier associated with the premises network.

In another variant, access to the premises network by the identified ones of the plurality of client devices comprises placing a unique identifier associated with the identified ones of the plurality of client devices onto a list of unauthorized devices, and the unique identifiers associated with the identified ones of the plurality of client devices are placed on the list of unauthorized devices by an authorized user of the premises network.

In yet another variant, the storage apparatus is configured to store at least a plurality of information regarding individual ones of the plurality of client devices authorized and not authorized to access the premises network.

In another variant, the apparatus is further configured to communicate with a database for storing at least a plurality of information regarding individual ones of the plurality of client devices authorized and not authorized to access the premises network.

In still another variant, the content delivery network comprises a cable television or satellite network, the premises network comprises a MoCA-compliant network comprising installed coaxial cable within the premises, and the apparatus is disposed at a headend of the cable or satellite network.

In yet another variant, the content delivery network is utilized to provide content to the plurality of client devices using internet protocol (IP)-based delivery mechanisms.

In a second aspect of the invention, a consumer premises equipment (CPE) for use in a content delivery network (e.g., cable network) is disclosed. In one embodiment, the CPE comprises an RF front-end interface, at least one back-end interface, a storage apparatus, and a processor configured to run at least one application thereon, the application configured to: authorize first ones of a plurality of client devices to access a premises network, and revoke access to the premises network by second ones of the plurality of client devices.

In one variant, the at least one back end interface comprises an interface to the plurality of client devices in the premises network.

In another variant, the storage apparatus comprises one or more databases having information relating to individual ones of the plurality of client devices being authorized and not authorized to access the premises network. The authorization of the first ones of the plurality of client devices may comprise reviewing the one or more databases for the first ones of the client devices and determining based at least in part on the information, that the first ones of the plurality of client devices are authorized to access the premises network. The revocation of the second ones of the plurality of client devices may comprise adding information relating to the second ones of the client devices to the one or more databases, the added information indicating that the second ones of the plurality of client devices are not authorized to access the premises network.

In yet another variant, the CPE is further in communication with at least one database comprising a list of client devices which are authorized to access the premises network, and a list of client devices which are not authorized to access the premises network, the authorization comprises searching the at least one database to determine on which of the lists the first ones of the plurality of client devices are listed, and the revocation comprises adding the second ones of the plurality of client devices to the list of client devices which are not authorized to access the premises network.

In a further variant, the at least one application comprises a distributed application, having at least one component thereof run at a headend entity of the cable network. The premises network may comprise a MoCA-compliant premises network. Lastly, in one variant, content is delivered to the CPE from the content delivery network via IP protocol.

In a third aspect of the invention, method of providing access to a premises network is disclosed. In one embodiment, the method comprises receiving information identifying at least one client device and at least one premises network, updating one or more lists of devices to include the entered information, receiving a request for access to the at least one premises network from the at least one client device connected thereto, and in response to the request, granting or denying access to the at least one premises network to the at least one client device.

In one variant, the information identifying the at least one client device comprises a MAC address associated with the at least one client device; and the information identifying the at least one premises network comprises a subscriber account number, and the act of updating comprises adding the MAC address and the subscriber account number one of the one or more lists. The request may comprise at least the MAC address associated with the at least one client device and the subscriber account number.

In another variant, the one or more lists comprising at least a white list of authorized devices, and a black list of unauthorized devices. The method may further include searching the white list and the black list using at least the information identifying at least one client device and at least one premises network. The act of granting or denying access may be based at least in part on whether the at least one client device is found on the white or the black list.

In yet another variant, the act of granting access to the at least one premises network comprises presenting the at least one client device a user interface for accessing data and content. The user interface for accessing data and content may comprise an electronic programming guide (EPG).

In another variant, the act of denying access to the at least one premises network comprises presenting the at least one client device a message indicating a reason for the denial of access. In yet another variant, the act of updating further comprises apprising at least one headend billing entity of the addition of the at least one client device to the listing of authorized devices for the at least one premises network.

In another variant, the method further comprises verifying the information identifying at least one client device and at least one premises network.

In a further variant, the premises network comprises a MoCA-compliant home network.

In a fourth aspect of the invention, computer readable apparatus comprising a medium configured to store a computer program is disclosed. In one embodiment, the computer program, when executed: receives a request for access to at least one premises network from at least one client device connected thereto, searches a list of authorized devices and a list of unauthorized devices, and grants or denies access to the at least one premises network to the at least one client device based at least in part on a result of the search.

In one variant, the computer program is further configured to, if the at least one device is not found at either the list of authorized devices or the list of unauthorized devices, enable the user to add the at least one device to either list. The at least one device may be added to either of the list of authorized devices or the list of unauthorized devices by the addition of descriptive information regarding the at least one device the list of authorized devices or the list of unauthorized devices.

In another variant, the computer program is further configured to, prior to receipt of the request, enable a user to add descriptive information regarding the at least one device to either of the list of authorized devices or the list of unauthorized devices. The addition of the descriptive information regarding the at least one device to either of the list of authorized devices or the list of unauthorized devices may comprise verification of the descriptive information against pre-stored information In a fifth aspect of the invention, a method of ensuring protected access to cable television network content to a MoCA-compliant premises network is disclosed. In one embodiment, the method comprises: receiving a request from a user device for access to the content from the premises network, determining whether the user device is specifically authorized to access the content via the premises network, if the user device is specifically authorized to access the content via the premises network, providing access thereto, the access to the content being provided via installed coaxial cable installed within the premises, if the user device is not specifically authorized to access the content via the premises network, determining whether the user device is specifically unauthorized to access the content via the premises network, if the user device is specifically unauthorized to access the content via the premises network, denying access thereto, and if the user device is not specifically authorized and not specifically unauthorized to access the content via the premises network: requesting a user of the user device provide a MAC address of the user device and a subscriber account number associated with the network premises, verifying the provided MAC address and the subscriber account number, and authorizing the user device to access the content via the network.

In one variant, the act of determining whether the user device is specifically authorized to access the premises network comprises searching a list of authorized devices, and the act of determining whether the user device is specifically unauthorized to access the premises network comprises searching a list of unauthorized devices.

Other features and advantages of the present invention will immediately be recognized by persons of ordinary skill in the art with reference to the attached drawings and detailed description of exemplary embodiments as described below.

DETAILED DESCRIPTION OF THE INVENTION

Figure 1:
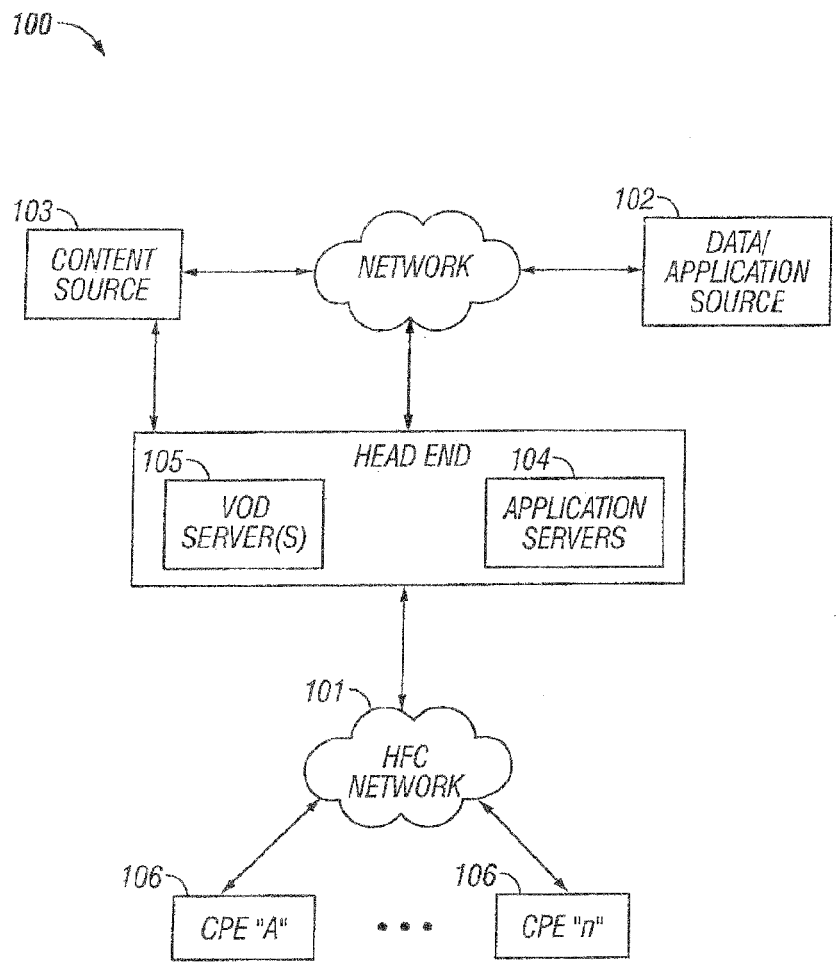
FIG. 1 is a functional block diagram illustrating an exemplary HFC cable network configuration useful with the present invention.

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set-top boxes (e.g., DSTBs), personal computers (PCs), and minicomputers, whether desktop, laptop, or otherwise, and mobile devices such as handheld computers, PDAs, personal media devices (PMDs), such as for example an iPod™, or Motorola ROKR, and smartphones.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (RealVideo, etc.), AC-3 (audio), DiVX, XViD/ViDX, Windows Media Video (e.g., WMV 7, 8, or 9), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA) Java™ (including J2ME, Java Beans, etc.), Binary Runtime Environment (e.g., BREW), and the like.

The terms "Customer Premises Equipment (CPE)" and "host device" refer to any type of electronic equipment located within a customer's or user's premises and connected to a network. The term "host device" refers generally to a terminal device that has access to digital television content via a satellite, cable, or terrestrial network. The host device functionality may be integrated into a digital television (DTV) set. The term "customer premises equipment" (CPE) includes such electronic equipment such as set-top boxes (e.g., DSTBs), televisions, cable modems (CMs), embedded multimedia terminal adapters (eMTAs), whether stand-alone or integrated with other devices, Digital Video Recorders (DVR), gateway storage devices (e.g., Furnace), and ITV Personal Computers.

As used herein, the term "display" means any type of device adapted to display information, including without limitation CRTs, LCDs, TFTs, plasma displays, LEDs, incandescent and fluorescent devices. Display devices may also include less dynamic devices such as, for example, printers, e-ink devices, and the like.

As used herein, the term "DVR" (digital video recorder) refers generally to any type or recording mechanism and/or software environment whereby content sent over a network can be recorded and selectively recalled. Such DVR may be dedicated in nature, or part of a non-dedicated or multi-function system.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network.

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet.

As used herein, the terms "Internet" and "internet" are used interchangeably to refer to inter-networks including, without limitation, the Internet.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network interface" refers to any signal, data, or software interface with a component, network or process including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11a,b,g,n), WiMAX (802.16), PAN (802.15), or IrDA families.

As used herein, the term "node" refers without limitation to any location, functional entity, or component within a network.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "wireless" means any wireless signal, data, communication, or other interface including without limitation WiFi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

The present invention provides, inter cilia, methods and apparatus for providing premises network access to individual ones of client devices. These methods and apparatus advantageously allow leased devices and customer retail devices to access content via a premises network, but limit such access only to the devices of authorized subscribers of the network operator (e.g., MSO).

In one embodiment, a list of devices authorized to access a premises network ("white list") and a list of devices not authorized to access a premises network ("black list") are utilized to implement this functionality. A user or technician may add a device to either list, or alternatively the device may be added by a substantially automated process. For example, a user may purchase or lease client equipment, connect the equipment to the premises network, and enter identifying information regarding the device (and the network as required) to an authorization manager (AM). The authorization manager verifies the information against subscriber information stored at a billing system or other trusted data repository or source, and once verified, provides access to the premises network to the device.

A device may be connected directly to a network and begin requesting content. If the device has been previously entered onto either the list of authorized devices or the list of unauthorized devices, the device is granted or denied access to content, respectively. The device seeks access in one embodiment by sending a message to an authorization manager. The authorization manager searches the lists of authorized and unauthorized devices to determine whether the requesting device should be given access to content, and if any other actions should be taken with respect to the device.

The list of authorized devices (white list) and list of unauthorized devices (black list), may be stored at a database or other location in communication with the authorization manager or alternatively, may be stored at the manager entity itself.

A client device's permission to access content on a particular premises network may also be revoked or modified. For example, an authorized premises network user may access a list of devices in his/her premises network. If one or more of the devices on the list of premises devices is not familiar to the user, the user may select the device(s) for removal from the premises network. After the user requesting removal is verified (e.g., authenticated), the authorization manager may remove the device(s) from the premises white list, and have the device(s) placed on a black list. When a device that has been black-listed from a premises network attempts to connect to the premises network, it will be found on the black list and access is denied. Other actions may also be taken, such as reporting the device to a security manager or other network entity for, inter alia, investigation of fraud or other surreptitious activity.

Business methods involving the foregoing technology, and a computerized" rules engine" for implementing business and operational rules, are also disclosed.

Detailed Description Of Exemplary Embodiments

Exemplary embodiments of the apparatus and methods of the present invention are now described in detail. While these exemplary embodiments are described in the context of the aforementioned hybrid fiber coax (HFC) cable or satellite system architecture having an multiple systems operator (MSO), digital networking capability, and plurality of client devices/CPE, the general principles and advantages of the invention may be extended to other types of networks and architectures, whether broadband, narrowband, wired or wireless, or otherwise, the following therefore being merely exemplary in nature.

It will also be appreciated that while described generally in the context of a consumer (i.e., home) end user domain or premises, the present invention may be readily adapted to other types of environments (e.g., commercial/enterprise, government/military, etc.) as well. Myriad other applications are possible.

It is further noted that while described primarily in the context of a system with 6 MHz RF channels, the present invention is applicable to literally any network topology or paradigm (whether wireline, wireless, or optical, of hybridizations thereof), and any frequency/bandwidth, such as for example 8 MHz channels. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems.

It will further be appreciated that while the exemplary embodiments presented herein are described in the context of services that may include multicast and unicast data, the present invention is applicable to other types of services that include multicast transmission of data delivered over a network having multiple physical channels or even virtual or logical channels.

Other features and advantages of the present invention will immediately be recognized by persons of ordinary skill in the art with reference to the attached drawings and detailed description of exemplary embodiments as described below.

Network—

FIG. 1 illustrates a typical content delivery network configuration with which the apparatus and methods of the present invention may be used. The various components of the network 100 include (i) one or more data and application origination points 102; (ii) one or more content sources 103, (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the headend architecture of FIG. 1a (described in greater detail below) may be used.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104.

Figure 1A:
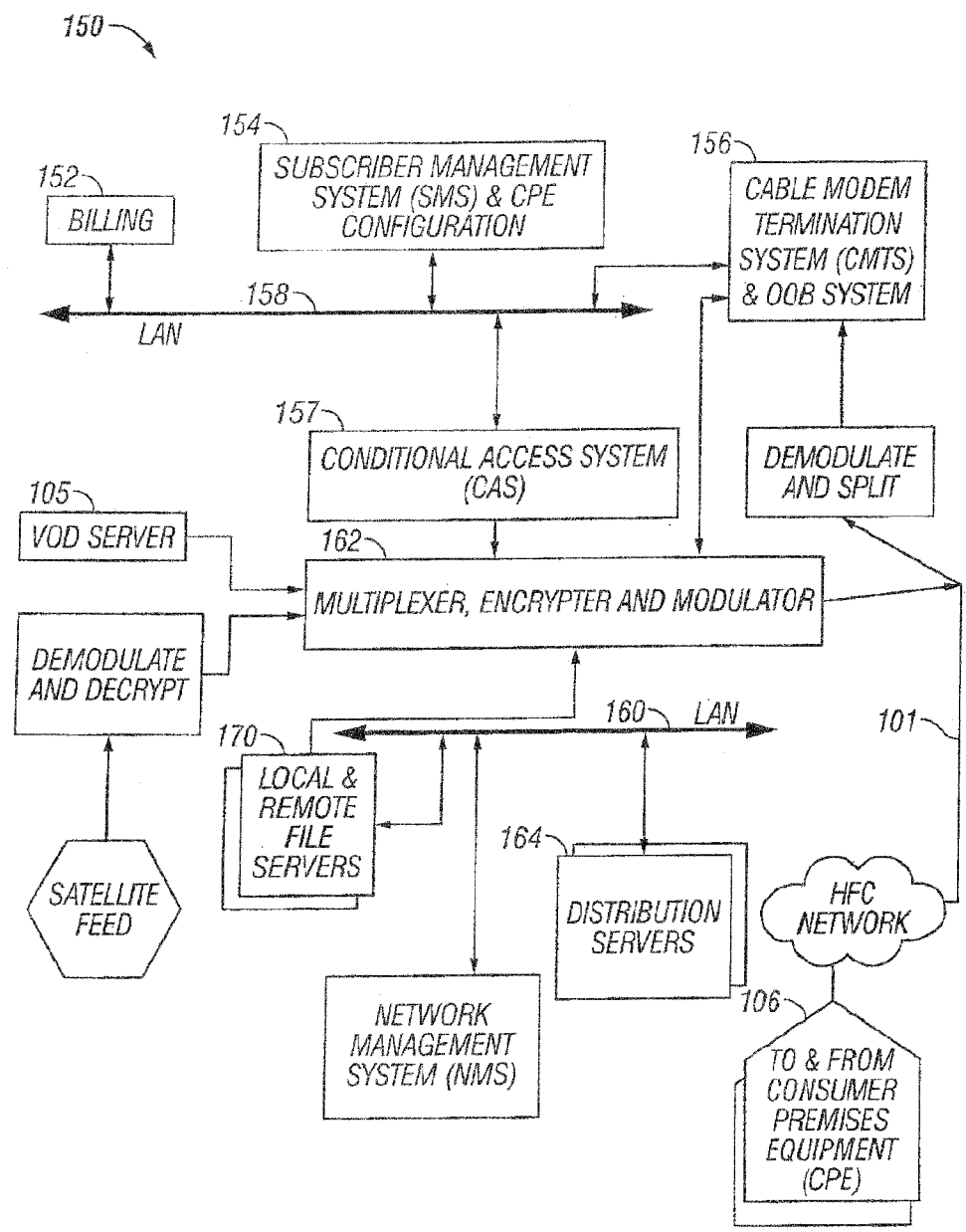
FIG. 1a is a functional block diagram illustrating one exemplary HFC cable network headend configuration useful with the present invention.

Referring now to FIG. 1a, one exemplary embodiment of a headend architecture useful with the present invention is described. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the headend configuration depicted in FIG. 1a is high-level, conceptual architecture and that each MSO may have multiple headends deployed using custom architectures.

Figure 1B:
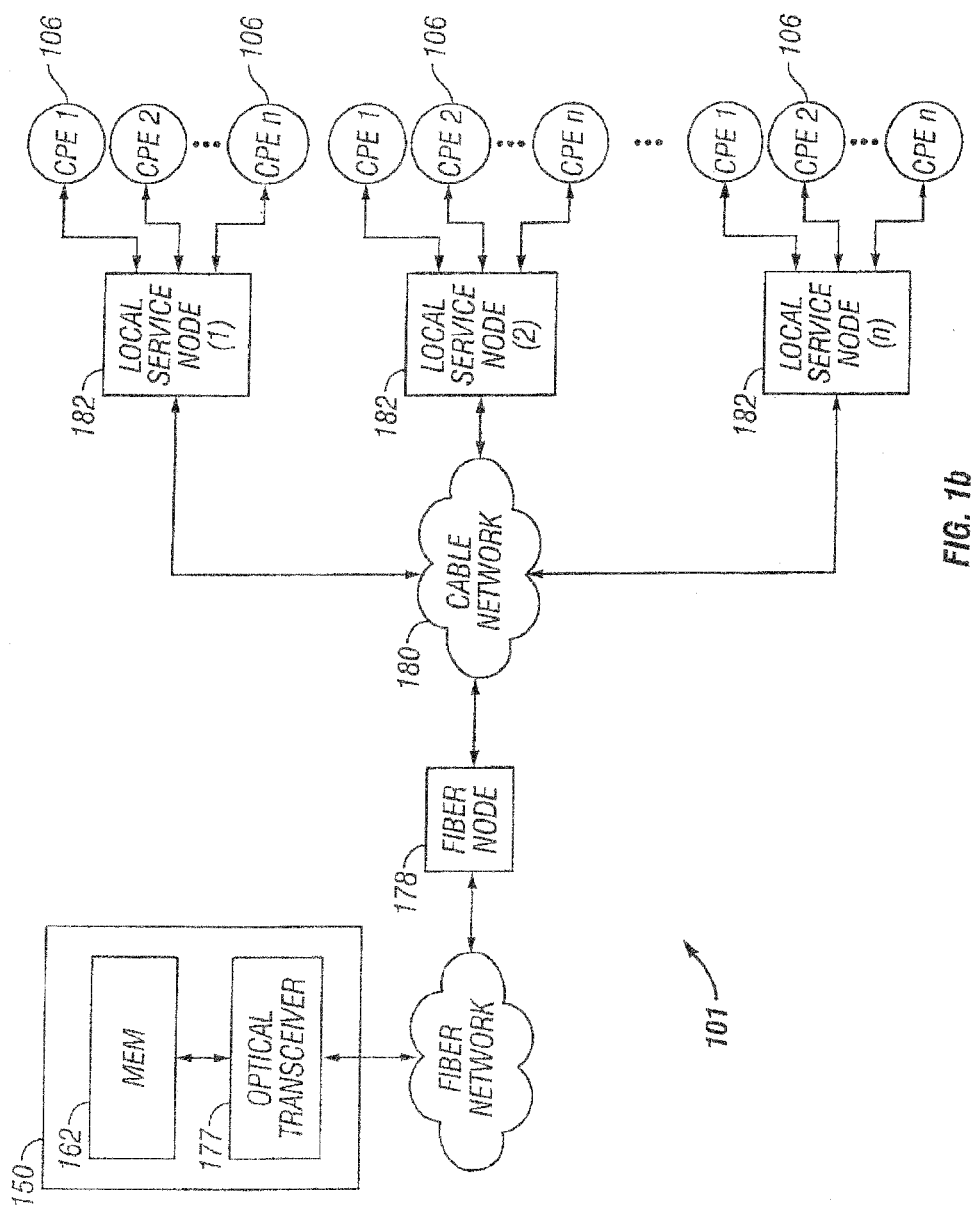
FIG. 1b is a functional block diagram illustrating one exemplary local service node configuration useful with the present invention.

The exemplary architecture 150 of FIG. 1a further includes a multiplexer-encrypter-modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VoD servers 105 are coupled to the LAN 160 as well, although other architectures may be employed (such as for example where the VoD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend as previously described, and sent to neighborhood hubs (FIG. 1b) via a variety of interposed network components.

Figure 1C:
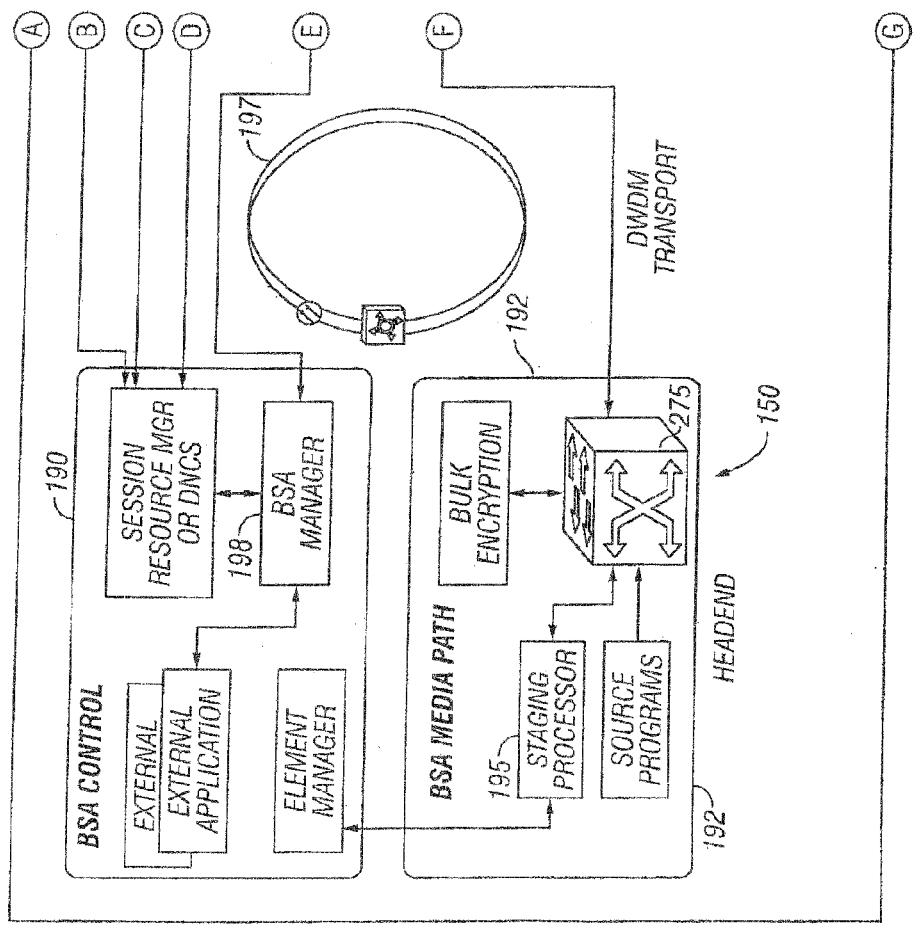
FIG. 1c is a functional block diagram illustrating one exemplary broadcast switched architecture (BSA) network useful with the present invention.
Figure 1C:
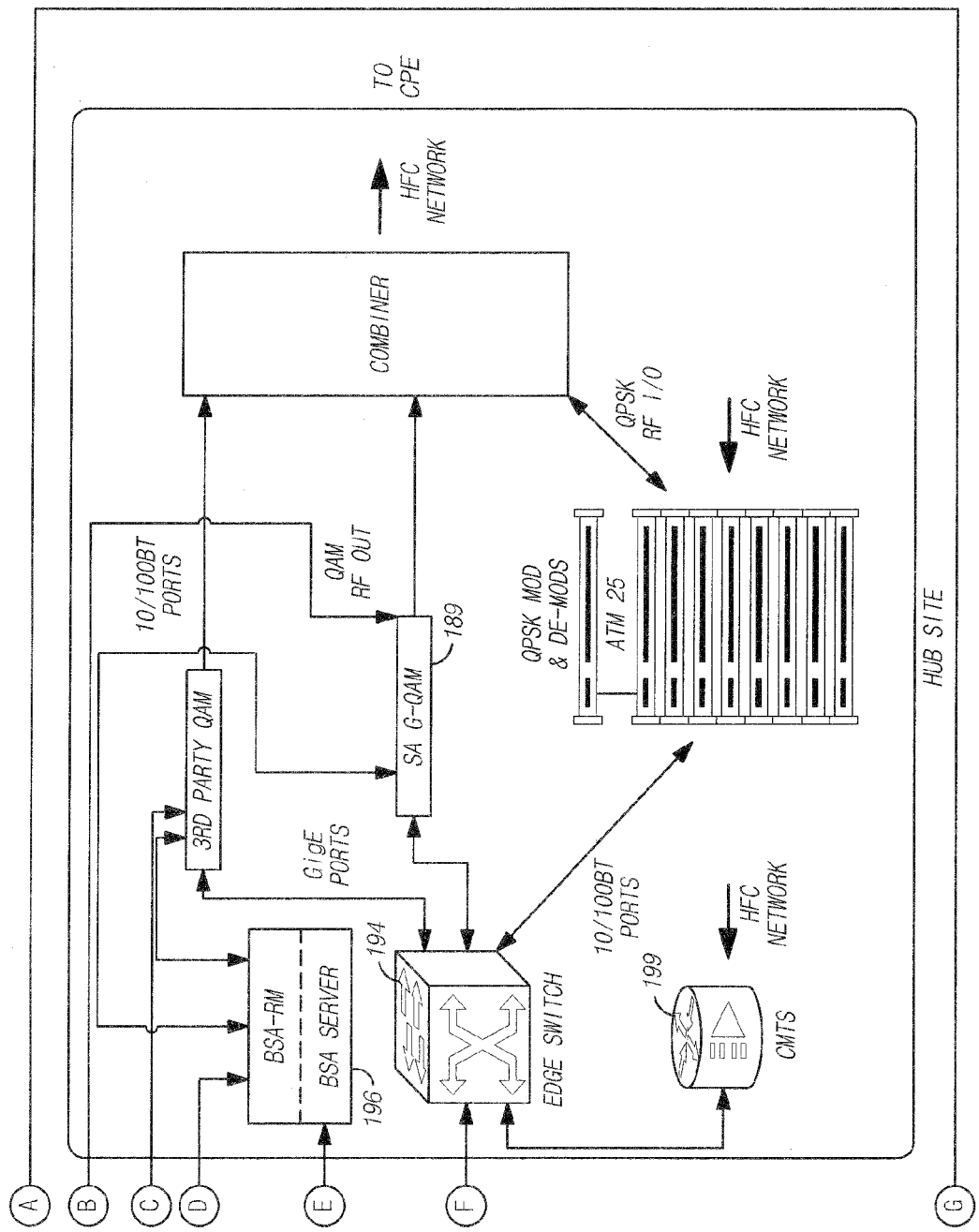

It will also be recognized, however, that the multiplexing operation(s) need not necessarily occur at the headend 150 (e.g., in the aforementioned MEM 162). For example, in one variant, at least a portion of the multiplexing is conducted at a BSA switching node or hub (see discussion of FIG. 1c provided subsequently herein). As yet another alternative, a multi-location or multi-stage approach can be used, such as that described in U.S. patent application Ser. No. 11/048,334, entitled "APPARATUS AND METHODS FOR MULTI-STAGE MULTIPLEXING IN A NETWORK" incorporated herein by reference in its entirety, which discloses inter alia improved multiplexing apparatus and methods that allow such systems to dynamically compensate for content (e.g., advertisements, promotions, or other programs) that is inserted at a downstream network node such as a local hub, as well as "feed back" and "feed forward" mechanisms for transferring information between multiplexing stages.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the invention is in no way limited to these approaches.

It will also be recognized that the multiple servers (broadcast, VoD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

"Switched" Networks—

FIG. 1c illustrates an exemplary "switched" network architecture also useful with the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber is unaware of any difference between programs delivered using a switched network and ordinary streaming broadcast delivery.

FIG. 1c shows the implementation details of one exemplary embodiment of this broadcast switched network architecture. Specifically, the headend 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned and co-pending U.S. patent application Ser. No. 09/956,688 filed Sep. 20, 2001 and entitled "Technique for Effectively Providing Program Material in a Cable Television System", incorporated herein by reference in its entirety, describes one exemplary broadcast switched digital architecture useful with the present invention, although it will be recognized by those of ordinary skill that other approaches and architectures may be substituted.

In addition to "broadcast" content (e.g., video programming), the systems of FIGS. 1a and 1c (and 1d discussed below) also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem.

Referring again to FIG. 1c, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPE. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

"Packetized" Networks—

Figure 1D:
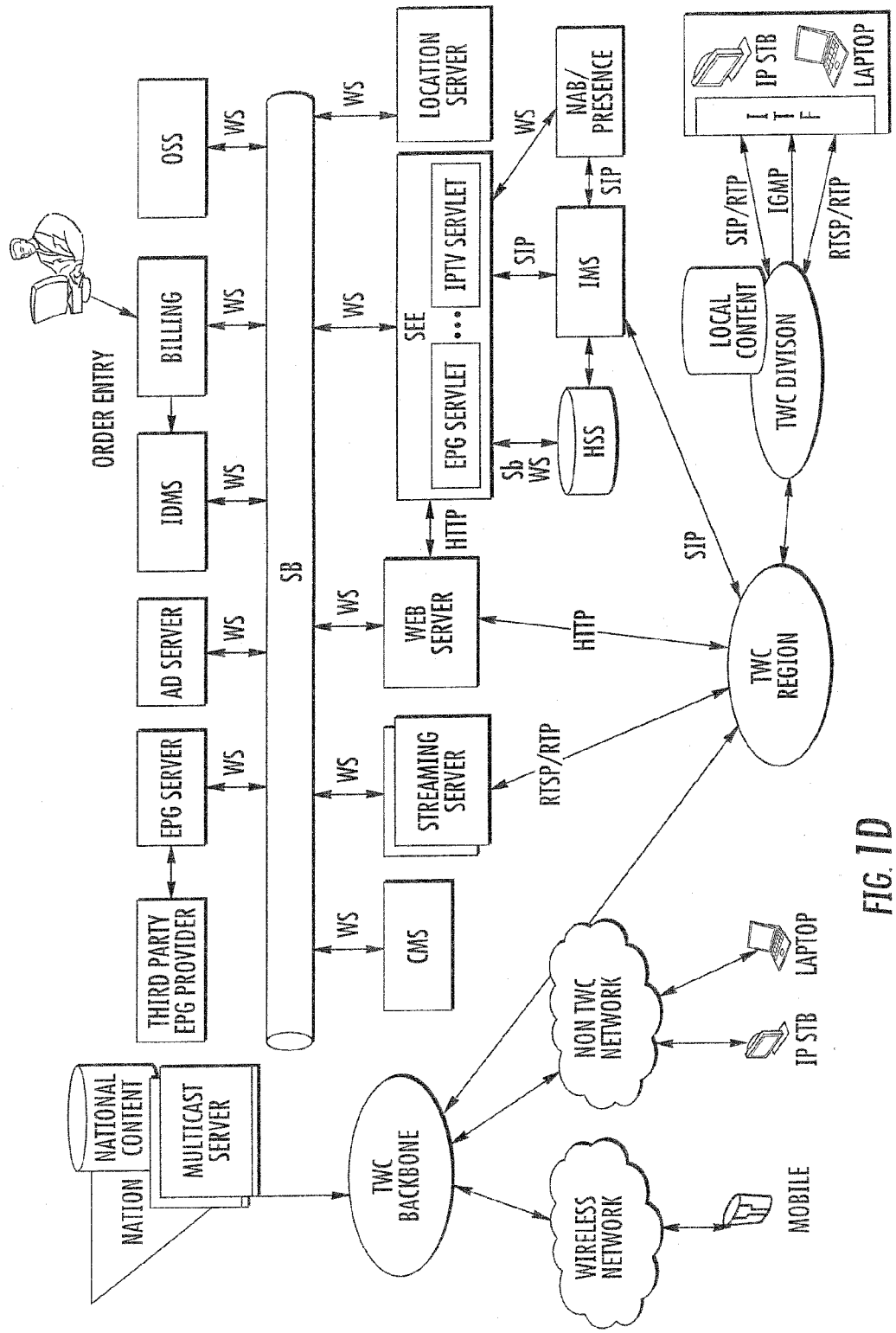
FIG. 1d is a functional block diagram illustrating one exemplary packetized content delivery network architecture useful with the present invention.

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the present invention, a "packet optimized" delivery network is used for carriage of the packet content (e.g., IPTV content). FIG. 1d illustrates one exemplary implementation of such a network, in the context of a 3GPP IMS (IP Multimedia Subsystem) network with common control plane and service delivery platform (SDP), as described in U.S. provisional patent application Ser. No. 61/256,903 entitled "METHODS AND APPARATUS FOR PACKETIZED CONTENT DELIVERY OVER A CONTENT DELIVERY NETWORK, previously incorporated herein. Such a network provides significant enhancements in terms of common control of different services, implementation and management of content delivery sessions according to unicast or multicast models, etc.; however, it is appreciated that the various features of the present invention are in no way limited to any of the foregoing architectures.

Premises Networking Architecture—

Figure 2:
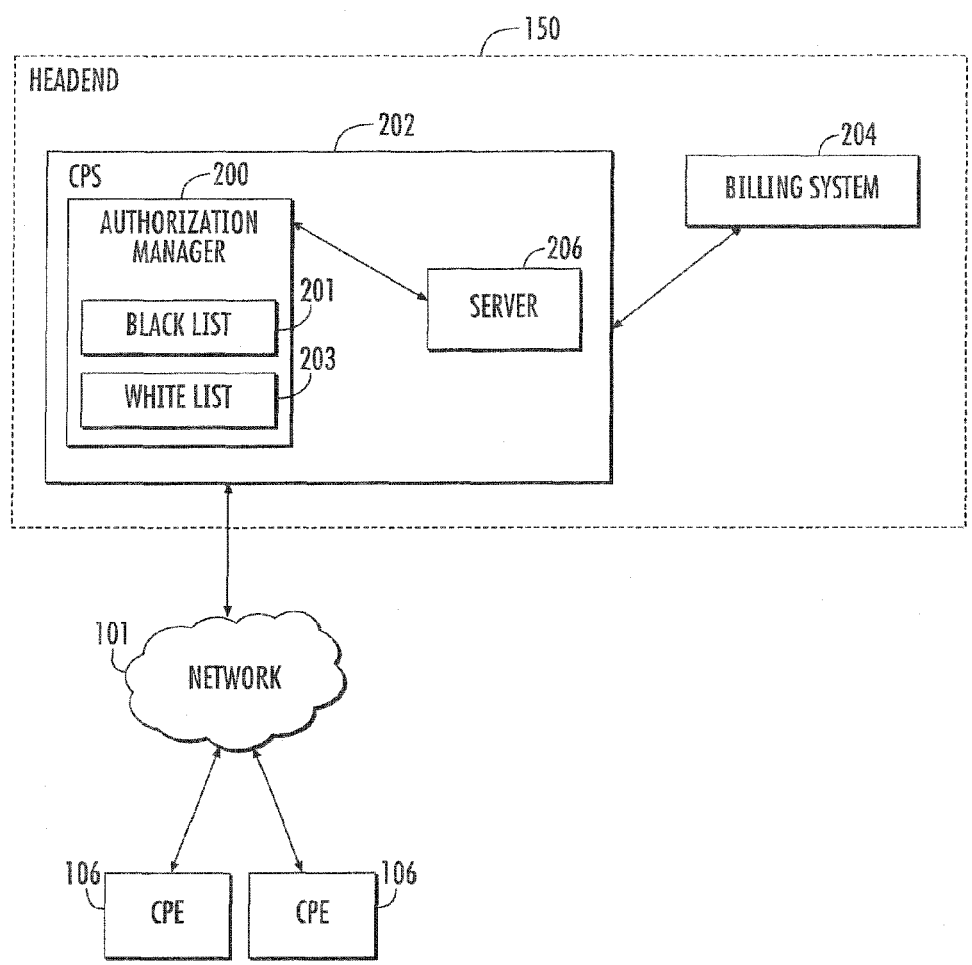
FIG. 2 is a functional block diagram illustrating a first embodiment of a network architecture for providing device authorization in a premises network according to the present invention.

Referring now to FIG. 2, one embodiment of a network topology for providing device authorization in a premises network according to the present invention is illustrated. As shown, the network headend 150 communicates with a plurality of client devices or consumer premises equipment (CPE) 106 via an HFC network 101. It is appreciated that in one embodiment, the premises network may include or be a network compliant with Multimedia Over Coax Alliance (MoCA) standards as disclosed in e.g., MoCA Specifications v10, February 2006; MoCA Specifications v1.1 Extensions, May 2007; and IEEE802.1 AVB WG Specifications, each of which is incorporated by reference herein in its entirety.

It is further appreciated that the network topology may comprise a Next Generation Home Architecture (NGHA) type architecture for delivering voice, video and data services. The NGHA terminates the plant specific protocols and distributes services using Internet Protocol (IP) based mechanisms. These mechanisms may advantageously comply with the previously mentioned open CE standards such as e.g., UPnP, CEA 2014, and DLNA, while still providing content security and access restrictions to non-customer devices or nomadic IP devices prohibiting these from gaining access to services in a network.

The network headend 150 (see also FIG. 1*a*) communicates with the CPE 106 via an intermediary HFC network 101 (and a hub), and via the premises network where installed (not shown). The "last mile" connection to the customer's premises is typically via coaxial cable, but in some instances, fiber optic cable replaces coaxial cable as in a fiber-to-the-home (FTTH) implementation. So-called "fiber-to-the-curb" or FTTC optical implementations may also be used.

The terminating coaxial cable is routed into the customer premises, and is connected to one or more CPE 106. Typically, program channel content is transmitted downstream from the cable headend 150 or a BSA switching node over in-band frequencies, and internet (e.g., Internet) content is transmitted from the cable modem termination system (CMTS) over DOCSIS frequencies.

The CPE 106 receives signals from the network via the coaxial cable, demodulates the signals, converts the demodulated signals into digital signals if required, and transmits the digital signals to a display device (e.g., television) or other apparatus. These signals may also be distributed via e.g., a back-end interface to DVRs, personal media devices (PMDs), and the like (not shown). The CPE 106 may farther comprise a cable modem which receives signals from the network, demodulates the signals from the CMTS, converts the demodulated signals into digital signals if required, and transmits the digital signals to a computerized device (e.g., personal computer) or series of computers in a premises local area network (LAN).

As illustrated, numerous entities are located at the cable network headend 150 of the exemplary network of FIG. 2. For example, a content provisioning system (CPS) 202 comprising an authorization manager 200 and application server 206, and a billing system 204, may be disposed at the headend 150 of the network. As will be discussed in greater detail below, the headend entities work together to provide authentication/authorization and verification of CPE 106 as the CPE 106 request access to content provided from the CPS 202.

The CPS 202 comprises one or more entities responsible for providing data and content to the CPE 106. The CPS 202 may be used to collectively refer to one or more of the headend entities discussed above with respect to FIGS. 1-1*d*, and may further include additional entities or processes discussed herein below. According to one embodiment, the CPS 202 utilizes an authorization manager 200 to determine whether a device is authorized to receive content before access to data/content is permitted.

The authorization manager 200 may be implemented as one or more software applications run at headend entity (e.g., an entity of the CPS 202), or alternatively at the CPE 106, or even as a distributed application (e.g., with a "server" or headend portion that is in process communication with a "client" portion disposed on one or more CPE 106 at the premises). The authorization manager 200 is adapted to manage access to data and content, and receives requests for content from various ones of the CPE 106 (or a proxy thereof, such as a converged premises device or gateway (not shown)). In response to a request, the authorization manager 200 determines whether the device 106 is on a "black list" 201 of devices not allowed to access services, on a "white list" 203 of devices 106 allowed to access services, or on neither list. CPE 106 listed on the white list 203 or black list 201 may be listed by a unique device identifier (such as MAC address, IP address, cryptographic hash (e.g., of the MAC address), or other identifier) and/or by premises which the device 106 is entitled to receive service from (such as by subscriber account number, physical address, IP address, etc.). In one example, when a request for content access is received, the manager 200 may use the MAC address associated with the request in order to determine whether the device 106 is on either of the lists 201, 203.

In one embodiment, if the device 106 is on a black list 201, the device 106 is denied access to data and content; and if the device 106 is on a white list 203, the authorization manager 200 facilitates access to the content, such as by providing the CPE 106 access to a user interface for the distribution of data and/or content. This "go/no-go" logic can be modified or implemented according to any number of different schemes, such as where different access privileges or rules are applied to different device classes (or even based on individual device IDs).

If the authorization manager 200 is not able to find the CPE 106 on either of the lists 201, 203, the CPE 106 may be added to a subscriber premises white list 203 as will be discussed below. Newly added devices 106 must be verified before content may be provided thereto. Devices 106 may also be removed from a white list 203 or black list 201 as needed, or their privileges modified.

Figure 2A:
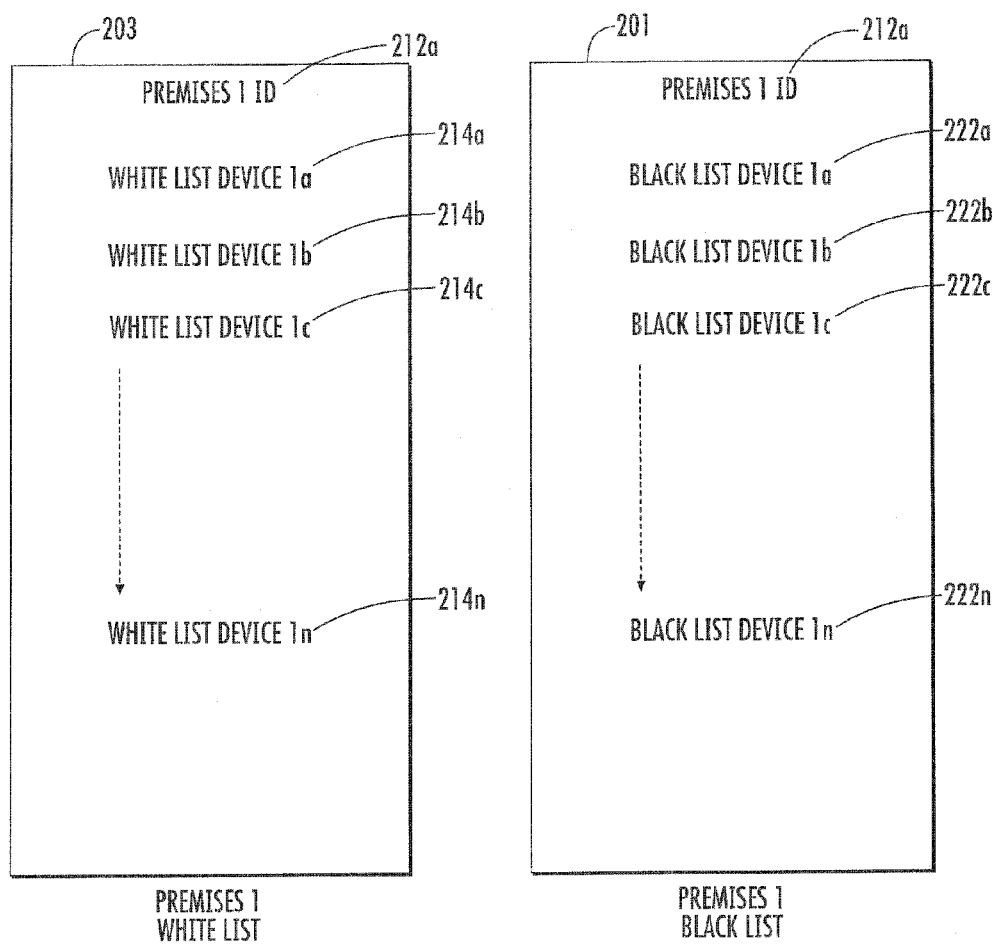
FIG. 2a is a block diagram illustrating one embodiment of a white list and a black list for use in the present invention.

In one embodiment, the white lists 203 and black lists 201 discussed above each comprise a plurality of lists held in a database, each of the individual white lists 203 and black lists 201 being premises—specific (and/or subscriber-specific, such as for example implementing parental control functions, or where the premises has two or more distinct living units or subscribers). As illustrated in FIG. 2*a*, for example, a white list 203 for a first premises, Premises 1, is stored according to premises identification information 212.

In one embodiment, the premises identification information 212 comprises a subscriber account number as issued by the MSO. Each of the device entries 214*a*, 214*b*, 214*e* . . . 214*n* representing CPE 106 allowed to access content in Premises 1 is listed on the white list 203. In one variant, the white list device entries 214*a*, 214*b*, 214*c* . . . 214*n* are listed on the white list 203 by a MAC address, IP address, or other device 106 identifier, so as to facilitate searching of the lists by a search algorithm. Other schemes may be used as well.

FIG. 2*a* also illustrates an exemplary black list 201 for the first premises, Premises 1. As shown, the black list 201 is stored according to the premises identification information 212 (such as subscriber account number). The black list 201 lists device entries 222*a*, 222*b*, 222*c* . . . 222*n* which represent CPE 106 that are prohibited from gaining access to content in the premises network. The devices 106 of the black list 201 may be listed by MAC address, EP address or other unique identifier, as with the white list. However, it will be appreciated that the white and black lists may be heterogeneous in form or organization; in fact, it may be desirous to organize or structure the two lists differently so as to leverage certain functions within the CPS or billing system.

Moreover, it will be appreciated that two or more white lists and/or black lists may be associated with a given premises or subscriber. For instance, a first white list might be used during certain periods of time (e.g., "prime time"), and second list used during other periods so as to implement MSO or content source policies.

The manager 200 may be adapted to store a white list 203 and a black list 201 for each of the user premises (or subscribers) serviced by the manager 200, or any subsets thereof (e.g., by zip code, association with a network distribution node, etc.). The lists 201, 203 may then be searched based on subscriber premises information (such as a subscriber account number) and/or by device 106 identification (such as a MAC address or IP address) in order to identify whether a particular device 106 is correlated to an entry on either a white list 203 or black list 201 for a premises/subscriber.

Figure 2B:
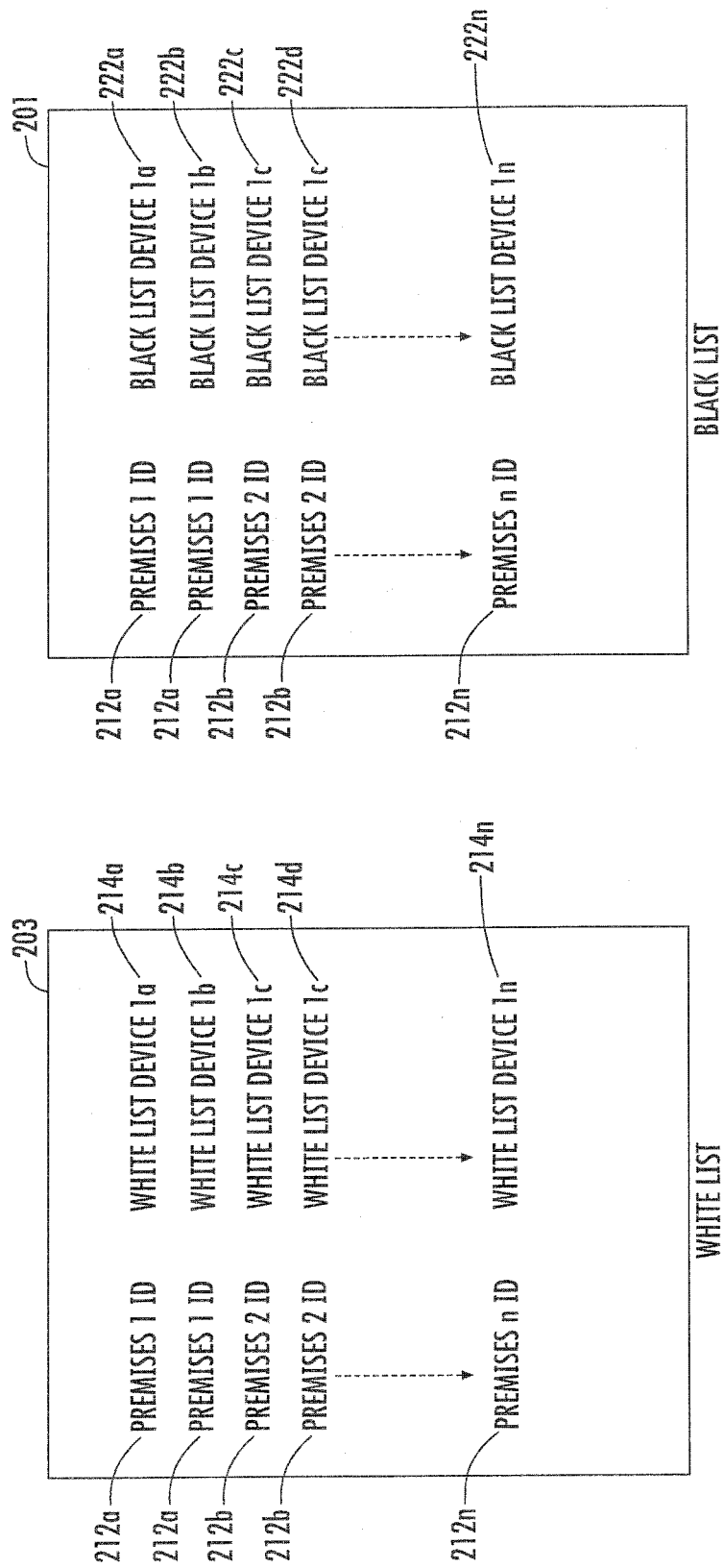
FIG. 2b is a block diagram illustrating another embodiment of a white list and a black list for use in the present invention.

Referring now to FIG. 2b, in another embodiment, the manager 200 may be adapted to store a single (aggregated) white list 203 and a single black list 201. The white list 203 contains a plurality of white listed device entries 214a, 214b, 214c, 214d . . . 214n each entry being associated to a subscriber premises (e.g., subscriber premises 1 212a, subscriber premises 2 212b, subscriber premises n 212n) or particular subscriber. Likewise, the black list 240 contains a plurality of black listed device entries 222a, 222b, 222c, 222d . . . 222n listed by subscriber premises 212a, 212b . . . 212n. As above, the lists 201, 203 may be searched based on subscriber premises information (such as a subscriber account number) and/or by CPE 106 identification (such as a MAC address or IP address) in order to identify whether a particular device 106 is on either a white list 201 or black list 203 for a premises or subscriber.

Alternatively, a single list (i.e., composite or aggregated white and black list) or database (not shown) may be stored having a plurality of devices 106 listed therein (by MAC or IP address) and information relating to each device 106, including information identifying a subscriber premises, and identifying whether the device 106 is or is not allowed access to content in the given premises.

Referring back again to FIG. 2, the authorization manager 200 is adapted to receive notifications from the CPS 202 when a CPE 106 requests access to content. In response to the notification, the manager 200 consults a white list 203 and a black list 201 (or a composite list) using information identifying the CPE 106 contained in the notification (such as MAC address or IP address). The manager 200 determines whether the requesting device 106 is authorized to receive content and, based on that determination returns, an "accepted" or "rejected" message to the CPS 202. Alternatively, such messaging overhead can be obviated in one variant by use of an "implicit" system whereby no affirmative accept or reject messages are sent, but rather merely access is granted (e.g., content download is permitted) or it is not, and in the case where the content is not made accessible within a given period of time, a rejection is presumed.

The authorization manager 200 is further configured to revoke a devices 106 authorization to access data and content, such as by placing the device on a black list 201.

In one embodiment, CPE 106 authorization may be revoked in response to a request to do so from an authorized user (e.g., authenticated premises subscriber) who has noticed the unfamiliar CPE 106 added to the user's white list 203. When the user of the CPE 106 which has been placed on the black list 201 requests access to content, the user is redirected to a revocation status page indicating the details of the CPE 106 revocation.

Alternatively, the revocation can be effected by a network entity; e.g., an algorithm or application which searches white lists for known "bad devices", or those exhibiting suspicious or prohibited behavior.

The server 206 is an entity of the CPS 202 adapted to provide an interface to the white lists 203 and/or black lists 201 for other headend entities. When a device is added to a white list 203 or to a black list 201 (or to a composite list comprising both allowed and prohibited CPE 106), the authorization manager 200 forwards information regarding the addition to the server 206 for updating. In one embodiment, the server 206 comprises an application server such as the Mystro Application Server (MAS) 205 device of Assignee hereof discussed in co-owned, co-pending U.S. patent application Ser. No. 11/263,015 filed Oct. 2, 2002 and entitled "Network based digital information and entertainment storage and delivery system", now published as U.S. Patent Application Publication No. 2003/0208767, which claims priority under 35 U.S.C. 119(e) the benefit of U.S. Provisional Application No. 60/377,963 filed on May 3, 2002, each of the foregoing incorporated herein by reference in its entirety.

The CPS 202, authorization manager 200 and server 206 are communicatively coupled to the headend billing system 204. The billing system 204 maintains records regarding subscriber accounts and CPE 106, and is well known in to those of ordinary skill in the art, and thus not be discussed in further detail herein. When a CPE 106 is added to a white list 201 or a black list 203, the authorization manager 200 forwards information regarding the addition to the server 206 and billing system 204 for updating.

Figure 2C:
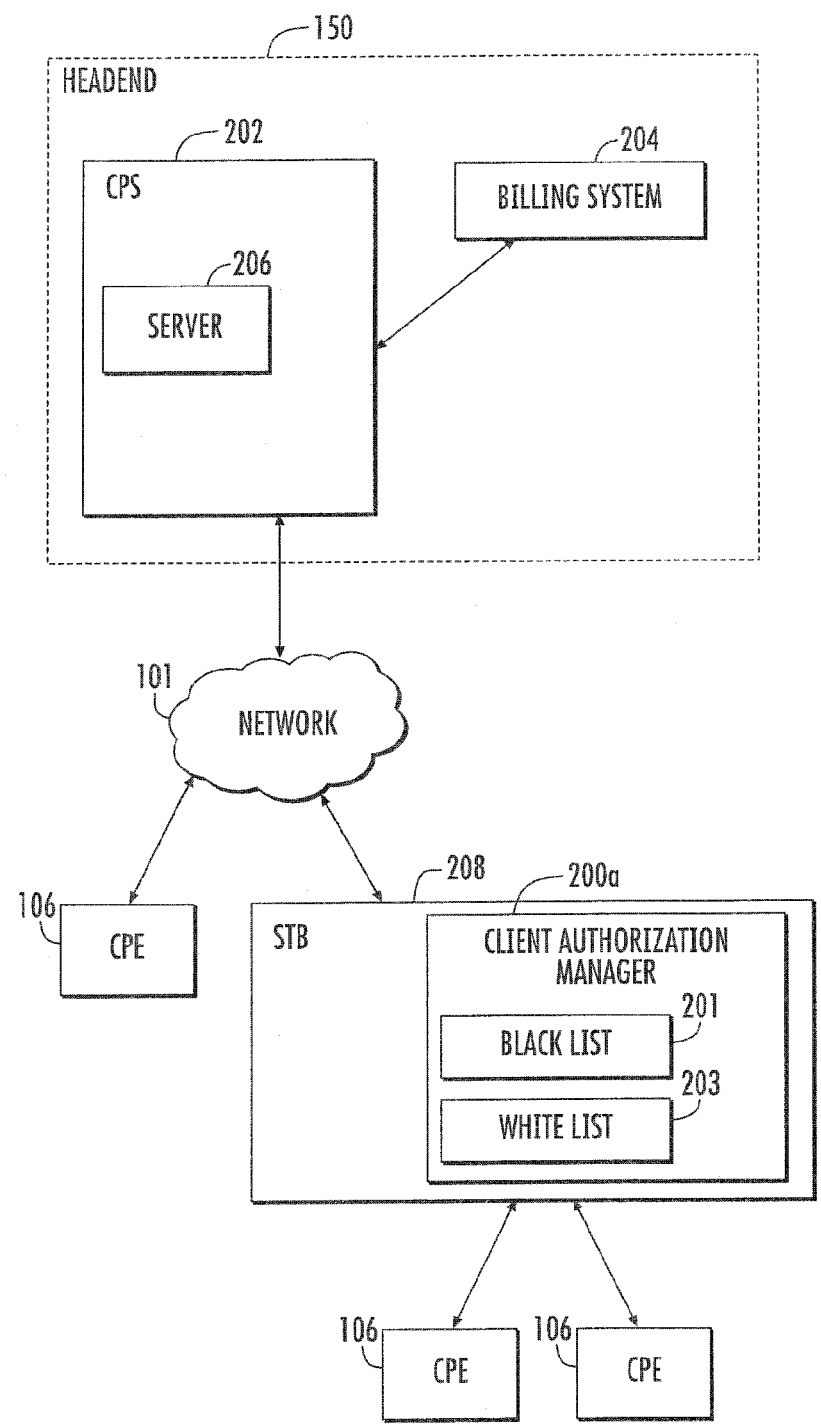
FIG. 2c is a functional block diagram illustrating another embodiment of a network architecture for providing device authorization in a premises network according to the present invention.

FIG. 2c illustrates another exemplary embodiment of a network topology for providing device authorization in a premises network according to the present invention. As illustrated, content is provided from the CPS 202 to various CPE 106 via the network 101. In the given embodiment, at least one of the CPE 106 in the network comprises a set top box (STB) 208 (including e.g., a digital STB). As illustrated, the STB 208 passes data and/or content between the CPE 106 in a premises network and various entities of the HFC network 101.

In the illustrated embodiment, the STB 208 is adapted to provide the functionality of the aforementioned authorization manager 200 (referred to herein as client authorization manager 200a) thereon. As described above with respect to the authorization manager 200 running at the CPS 202, the client authorization manager 200a comprises one or more software applications adapted to manage access to data and content. Specifically, when a CPE 106 requests access to data/content, the authorization manager 200a determines whether the device 106 is on a black list 201 of devices not allowed to access services, on a white list 203 of devices 106 allowed to access services, or on neither list. The white list 203 and black list 201 may be stored locally at the STB 208 client authorization manager 200a. Alternatively, the black list 201 and white list 203 may be stored at an entity accessible by the STB 208 via the network 101 (e.g., remote to the STB 208 and/or not at the user premises), such as at the CPS 202. The client authorization manager 200a may also be configured to enable devices to be removed from a white list 203, e.g., have access to their premises network revoked.

In yet another embodiment (not shown), the authorization manager 200, 200a may comprise a distributed application having both a client portion (at the STB 208) and a server or headend portion (at the CPS 202) as previously noted. The server and client portions communicate over the network (e.g., via OOB channels, or via in-band channels for downstream communications and OOB for upstream communications). In such an embodiment, the white and black list(s) may be maintained at either the CPE or the CPS (or another network entity in communication with either).

In one embodiment, the STB 208 may comprise a converged premises device such as is described in co-owned, co-pending U.S. patent application Ser. No. 11/378,129 filed Mar. 16, 2006 and entitled "Methods and Apparatus for Centralized Content and Data Delivery", published as U.S. Patent Publication No. 2007/0217436, which is incorporated herein by reference in its entirety. As discussed therein, in one embodiment, the exemplary STB 208 comprises a remotely manageable premises device that, inter alia, acts as a centralized client networking platform, providing gateway services such as network management as well as traditional content and high-speed data delivery functions. The device also acts as the shared internet connection for all devices in the premises via a cable modem or other such interface, sharing personal and DVR content such as video, music and photos (and any associated metadata) throughout the premises, and providing both a wired and wireless network in the home. Telephony services utilizing e.g., embedded multimedia terminal adapter (eMTA) and/or Wi-Fi architectures may also be provided via the STB 208; these services can make use of the network operator's indigenous VoIP or comparable telephony capability if desired, thereby providing an even more unified service environment for the subscriber. The STB 208 can also provide a trusted domain for content or data, as well as allowing a subscriber total mobility in the home. The exemplary STB 208 is also advantageously accessible via any remote device with internetworking (e.g., Internet) capability, thereby allowing personal content to be accessed by the user (or other entities) from outside the premises.

In another implementation (not shown), content and/or data may be distributed to or from a CPE 106 or STB 208 (or a cable modem associated with either the CPE 106 or STB 208) via Worldwide Interoperability for Microwave Access (WiMAX) transport; see IEEE Std. 802.16e-2005 entitled "IEEE Standard for Local and metropolitan area networks—Part 16: Air Interface for Fixed and Mobile—Broadband Wireless Access Systems Amendment 2: Physical and Medium Access Control Layers for Combined Fixed and Mobile Operation in Licensed Bands" which is incorporated herein by reference in its entirety). For example, multiple WiMAX base stations may be established by the MSO or other content/service provider. One or more of the WiMAX stations transmit programming or other content and/or data to the CPE 106 or STB 208 (which may include simultaneously, so as to ensure a robust signal is received and to potentially support any QoS requirements). In one embodiment, a CPE 106 having an associated cable modem may transmit and receive out-of-band data via WiMAX transport. In yet another embodiment, in-band content and/or data may also be sent/delivered using the aforementioned WiMAX transport. In this fashion, the WiMAX transport acts as a wireless data "pipe" in parallel to the normal DOCSIS or in-band RF channels (e.g., QAMs) transmitted over the cable or satellite distribution network.

It should be noted that the above-described network topologies shown in FIGS. 2 and 2c are merely exemplary of the broader principles of the invention; many other network configurations and possible topologies can be realized in accordance with the invention.

Authorization Methodology—

Figure 3A:
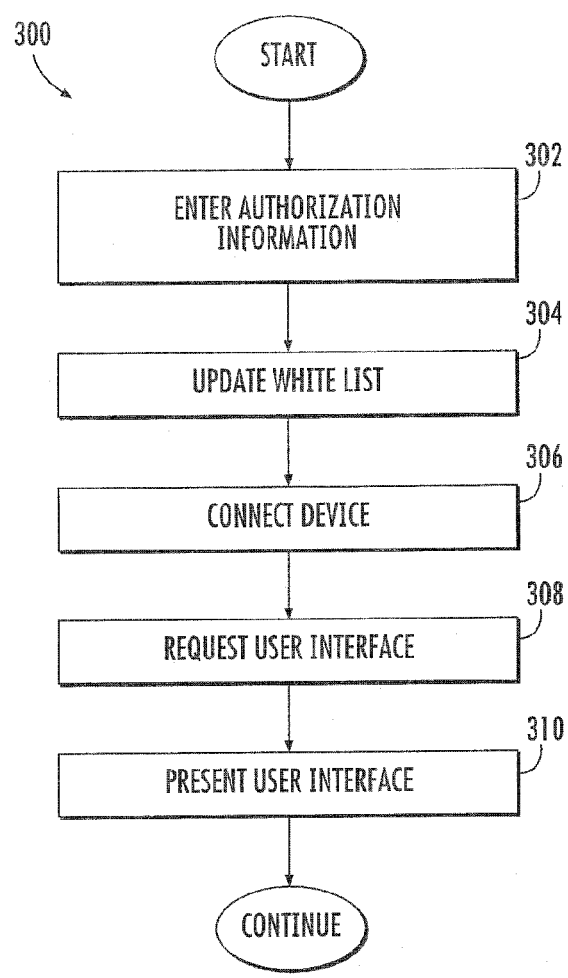
FIG. 3a is a logical flow diagram illustrating one embodiment of the method for authorizing a device in a protected premises network according to the invention.

As indicated above, in order to access a premises network, a device 106 must be authorized to do so. Referring now to FIG. 3a, an exemplary method 300 for authorizing a device in a premises network is described. As illustrated, per step 302 of the method, a technician or other user enters authorization information regarding a particular device 106. For example, when a subscriber leases a CPE 106 from an MSO, the subscriber may telephone a technician, who then accesses the authorization manager 200 via e.g., the server 206. Alternatively, the authorization manager 200 may be directly accessible to the MSO technician via a secure interface, whether the technician is physically present at the user's premises or was contacted via telephone or other method as above. The technician enters authorization information which may include the MAC address for the newly leased device as well as subscriber account information (such as account number, etc.).

In still another embodiment, the device information is entered automatically; e.g., upon startup of the authorization manager client application on the CPE, which contacts the headend application component to negotiate adding the device to a white list upon entry of proper authentication data by a user or technician.

Per step 304, the manager 200 updates a white list 203 to include the authorization information. In one embodiment, an individual premises may only be entitled to have a limited number of approved devices. For example, MoCA standards list that no more than 16 premises devices may be utilized in a single premises network (see MoCA Specifications v10, February 2006; MoCA Specifications v1.1 Extensions, May 2007; and IEEE802.1 AVB WG Specifications, previously incorporated herein). This limitation is meant to keep the number of devices on the home network restricted to the valid devices of the account, but it will be appreciated that (as discussed below) the MSO may limit the number of devices to any maximum and may, in one embodiment, require additional consideration for addition of devices above a maximum or threshold value (or on a per-device basis).

The updated information is then forwarded to the billing system 204 and the server 206 to reflect the addition of the device 106. The billing system 204 may utilize the approved device list to track the devices installed in the home for billing purposes.

As noted previously, the manager 200 entity stores a white list 203, which has been updated (per step 304) to include the newly authorized device 106. Once this configuration is complete, and the new device 106 is physically connected to the premises network (step 306), the device 106 sends a request for access to a user interface. The user interface is configured for providing data and/or content to the device 106 (step 308). In one embodiment, the user interface comprises an electronic program guide (EPG); alternatively, the user interface may comprise a start-up screen or window for the receipt of content and/or data. Other types of user interfaces will also be recognized by those of ordinary skill given the present disclosure, including e.g., audible/speech interfaces, keypads, etc. The user interface may also be configured to allow the user to browse directories or other listings of content to which they desire to gain access.

Since the requesting device 106 has been previously added to the white list 203, at step 310 the user interface is presented thereto. In other words, the request is received at the authorization manager 200, 200a which then determines whether the device 106 is on the white list 203 such as by utilizing information identifying the device (e.g., MAC or IP address) extracted from the request as well as premises information (such as subscriber account) and comparing this information the white list 203 entries. The premises information may be obtained from the billing system 204.

In one embodiment, the authorization of a device as discussed herein may be accompanied by a listing of the particular capabilities or services a device is authorized to access. For example, a particular device, once authorized (e.g., per the method of FIG. 3*a*), may only be authorized to receive or download content, and may not be authorized to share content with other devices. Authorization for one or more alternative or additional capabilities may also be provided.

It is further appreciated that if the device 106 device is not on the white list 203, the manager 200, 200*a* may determine whether the device is on the black list 201. As above, the determination may be based on a unique identifier associated with the device such as e.g., MAC address or IP address, as well as premises or subscriber information (such as subscriber account). If the device 106 is on the black list 201, access to the user interface, and thus to content/data, is denied.

Still further, if the device 106 is not found on the black list 201 or the white list 203, the technician or user may be requested to re-enter authorization information. In other words, an error may have been made or the device improperly removed from one of the lists, and thus authorization information and the authorization process must begin again.

Figure 3B:
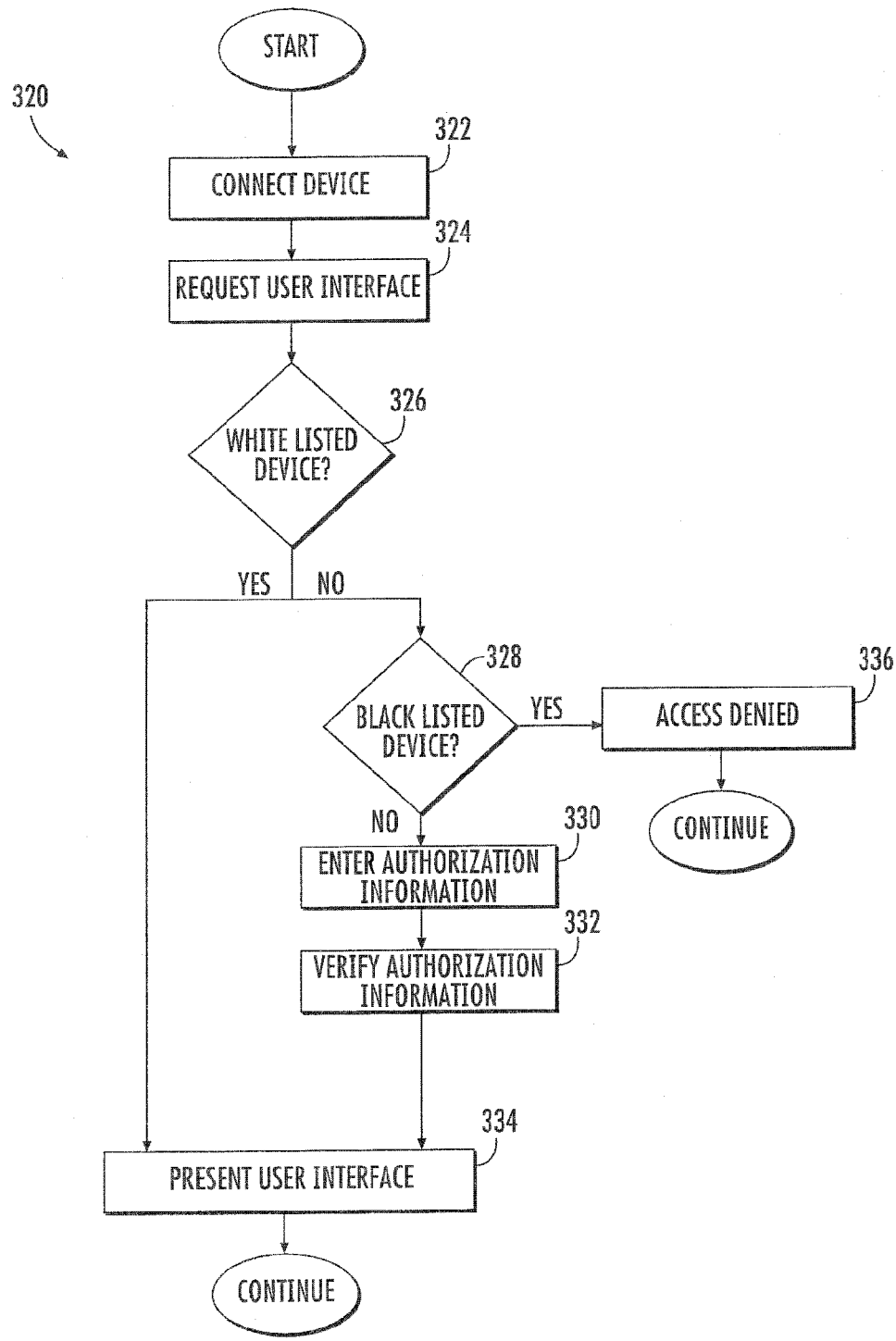
FIG. 3b is a logical flow diagram illustrating a second embodiment of the method for authorizing a device in a protected network according to the invention.

FIG. 3*b* illustrates a second exemplary method 320 for authorizing a device in a protected network. Although described with respect to a retail device (i.e., a device which has not been leased to the subscriber from the MSO), it will be appreciated the method may be equally applicable for authorizing a subscriber leased device.

Per step 322, the user connects a new device 106 to the premises network. The newly connected device 106 then sends a request to access the user interface for receiving content and data (step 324). In one embodiment, the device 106 detects at least one entity of the CPS 202 for providing the user interface (e.g., authorization manager 200) and requests access therefrom. Alternatively, the CPE 106 may request access from a client authorization manager 200*a* running on an STB 208 (as disclosed above with respect to FIG. 2*c*).

The authorization manager 200, 200*a* determines, at step 326, whether the requesting device 106 is approved. In one embodiment, this comprises using information identifying the device 106 to query the white list 203. If the device 106 is an approved device 106, e.g., it is listed on a white list 203, then per step 334 the device 106 is granted access to the user interface.

If the requesting device 106 is not white-listed, the authorization manager 200, 200*a* next determines whether the device 106 has been previously disapproved (step 328), e.g., whether the device 106 is listed on a black list 201. If the device 106 is listed on a black list 201, access to the user interface is denied (step 336).

However, if the device 106 has not been black listed (and was not previously white listed), the authorization manager 200, 200*a* returns one or more messages requesting a user of the device 106 to enter authorization information. The authorization information is entered at step 330 and in one embodiment includes information identifying the device 106 and/or the subscriber account or premises to be associated with the device 106. This may also entail entering password or other authentication data, or even presentation of a digital certificate or signature. In one embodiment, the manager 200, 200*a* requests the MAC address of the device and a subscriber account number. The manager 200 may, in a further embodiment, also request authorization to charge fees associated with the additional device to the subscriber account.

The authorization information entered at step 330 is verified at step 332. Verification comprises, in one embodiment, a comparison of the provided information to stored information regarding subscribers (e.g., a subscriber database). The subscriber information may be stored at e.g., the billing system 204 or other headend entity. Once it is determined that the subscriber account information matches a current subscriber account, information regarding the device 106 is added to a white list 203, and the manager 200 the device 106 is given access to the user interface (step 334).

If a device 106 cannot be verified as belonging to an existing subscriber account, the user may make additional attempts to verify the device (e.g., may re-enter authorization information at step 330). However, it is appreciated that the number of times a user may attempt to verify a device 106 may be limited. AT that point, the user may be forced to consult a network operator or customer service representative, or an alternative verification procedure invoked.

Information regarding newly verified devices 106 is also transmitted via the manager 200, 200*a* and/or server 206 to the billing system 204 for updating subscriber accounts accordingly. As will be discussed below, addition of devices to a premises network may be associated with increased subscription fees.

It will also be appreciated that under the present invention, white-listing and black-listing can be conducted on a per-network basis, or alternatively on a per-content element (or per-service) basis irrespective of the point of access. For example, while the foregoing embodiments are generally described as associating a requesting device logically with a given premises (and hence premises network) in order to determine whether access to content or services can be granted, the white list may associate a device with a user who, when properly authenticated, can access content irrespective of where the access is attempted from. For instance, a user may have a Personal Media Device or other portable electronic device registered or white-listed for their premises, but the white list may also reflect the ability of that device to access content from a neighbor's house, the user's office, an WLAN hotspot, and so forth.

Figure 3C:
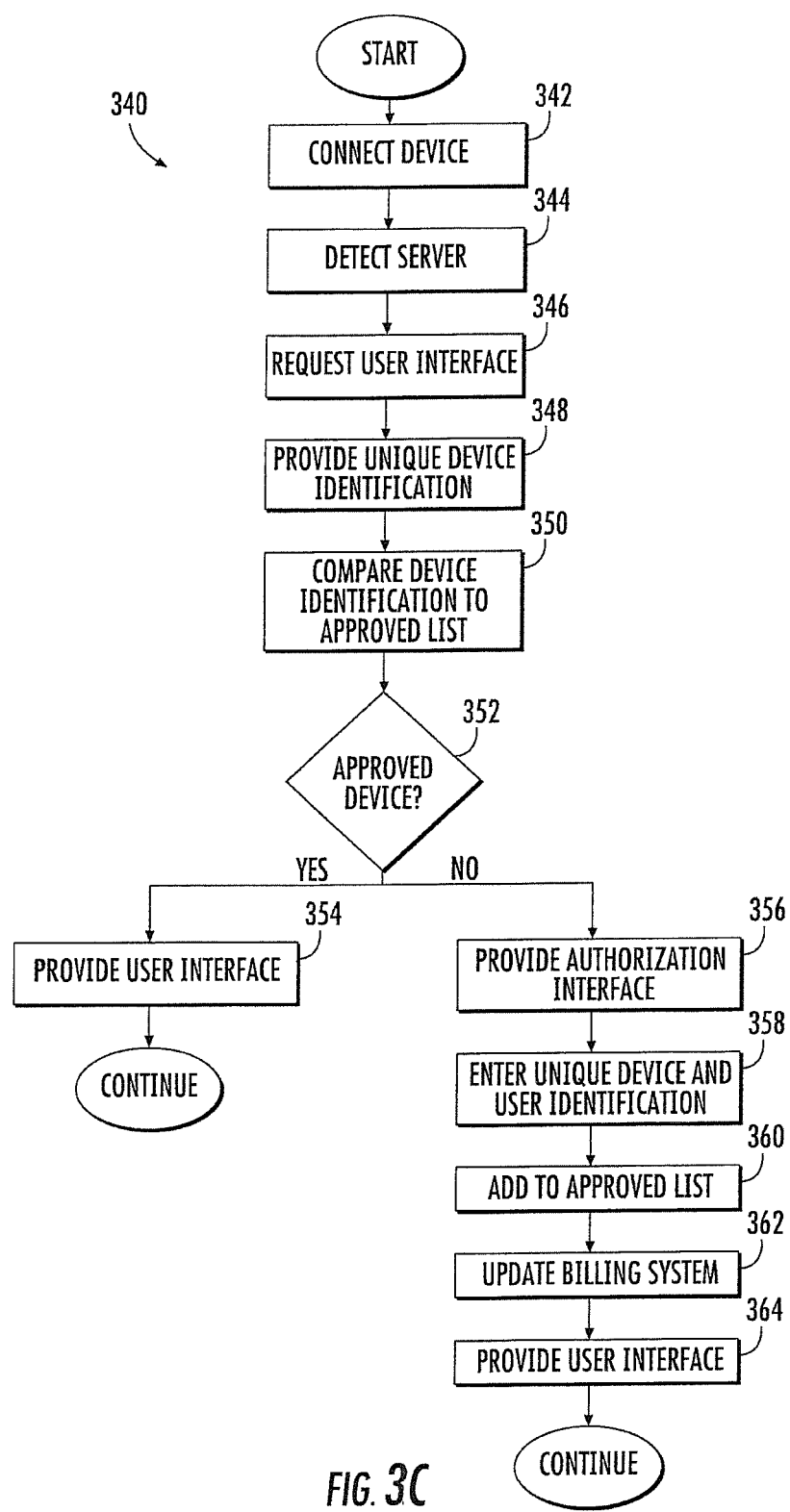
FIG. 3c is a logical flow diagram illustrating a third embodiment of the method for authorizing a device in a protected network according to the invention.

Referring now to FIG. 3*c*, yet another exemplary method 340 for authorizing a device in a protected network is described. As shown, per step 342, a user CPE 106 is connected to the network and obtains an IP address. The user CPE 106 may comprise a retail device (e.g., a device not purchased or leased from the network operator) or may comprise a device purchased or leased from the network operator. The connected device 106 detects the server 206 at step 344. In one embodiment, the server comprises a CEA-2014B RUI server. The connected device 106 requests the user interface from the server 206 at step 346. The server receives the user interface request from the client device 106, and, in response queries the CPE 106 for a unique device identification. At step 348, the unique device identification is provided to the server. For example, the unique device identification information may comprise the MAC address, IP address, or other identifying information (such as login/password or account number).

Per step 350, the server compares the unique identification to an approved device list (e.g. white list). If it is determined at step 352 that device 106 is approved, then per step 354, the CPE 106 is directed to the proper user interface. If it is determined at step 352 that the device 106 is not approved, the server 204 directs the CPE 106 to the authorization interface (step 356).

At the authorization interface, the CPE 106 is prompted to enter device identification and user identification information. For example, the CPE 106 may enter the MAC address, IP address or other device identification information as well as user information such as e.g., a password, subscriber account number, etc. Once entered, per step 360, the information is recorded and stored on the approved device list; the billing system is then updated with the added information per step 362. A device can be added through the aforementioned authorization interface, or alternatively may be added via a web "user" interface.

Revocation Methodology—

In many instances, it may be desirable for a previously white listed device to be removed therefrom, and instead placed on a black list 201 thus denying the device's access to a particular premises network. For example, if a device is no longer being used by the subscribers in a premises network, the subscriber may seek to remove the device from the list of authorized devices. Further, if it is discovered that a first user's device has, whether intentionally or unintentionally, been granted access to a second user's subscriber network, the first user's device should be black listed with respect to the incorrect network.

Figure 4A:
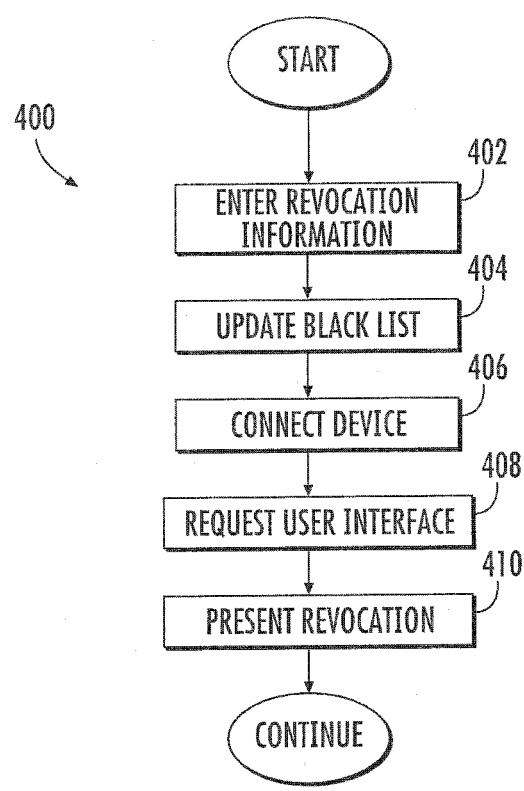
FIG. 4a is a logical flow diagram illustrating one embodiment of the method for revoking authorization of a device in a protected premises network according to the present invention.

Referring now to FIG. 4a, an exemplary method 400 for revoking authorization of a client device 106 to access a premises network is described. In the illustrated embodiment, per step 402, revocation information is entered the revocation information may comprise information identifying the CPE 106 to be revoked or black listed, as well as information identifying the subscriber account(s) for the premises which the CPE 106 is denied access to. For example, a MAC address of the device 106 to be added to a black list 201, as well as the subscriber account number (or IP address) associated with the premises which the device 106 is revoked from may be provided to the authorization manager 200.

At step 404, the authorization manager 200 uses the provided revocation information to update a black list 201. In one embodiment, the authorization manager 200 adds the identification information of the revoked CPE 106 to a black list 201 associated with the indicated premises. Alternatively, the revoked CPE 106 identification information and premises information may be added to a black list 201 containing black listed devices for more than one premises (or to a composite white/black list as described above).

Information regarding newly revoked devices 106 is also transmitted via the manager 200, 200a and/or server 206 to the billing system 204 for updating subscriber accounts accordingly. As will be discussed below, revocation of devices to a premises network may be associated with decreased subscription fees.

The updated information is then forwarded to the billing system 204 and the server 206 to reflect the revocation of the device 106. The billing system 204 may utilize the revoked device list to track the devices installed in the home for billing purposes.

Next, a user connects the revoked device 106 to the premises network (step 406) and the device 106 requests access to a user interface for providing data and/or content to the device 106 (step 408).

Since, as indicated above, the device has been added to the black list 201, the request for access to the user interface is denied, and instead a revocation message is presented to the device 106 for display on a display device associated therewith (step 410). In other words, the manager 200, 200a receives the request and uses information contained in the request, including device identification and premises identification information, to search the white list 203 for the device 106. If the device 106 is found on the white list 203, the as discussed above, access to the user interface is granted. If the device is not found on the white list 203 (in the present instance it will likely not be found on the white list 203), the manager 200, 200a next searches the black list 201 for the device 106. When the CPE 106 is found on the black list 201, the authorization manager 200, 200a responds to the CPE 106 by presenting the revocation message (step 410).

The revocation message presented at step 410 may present the user with information explaining that the device has been revoked, and providing a reason (e.g., textual explanation, revocation code, etc.) for the revocation. For example, the device 106 may be revoked for non-compliance, security issues, surreptitious or unauthorized behavior, subscription termination, etc.

Figure 4B:
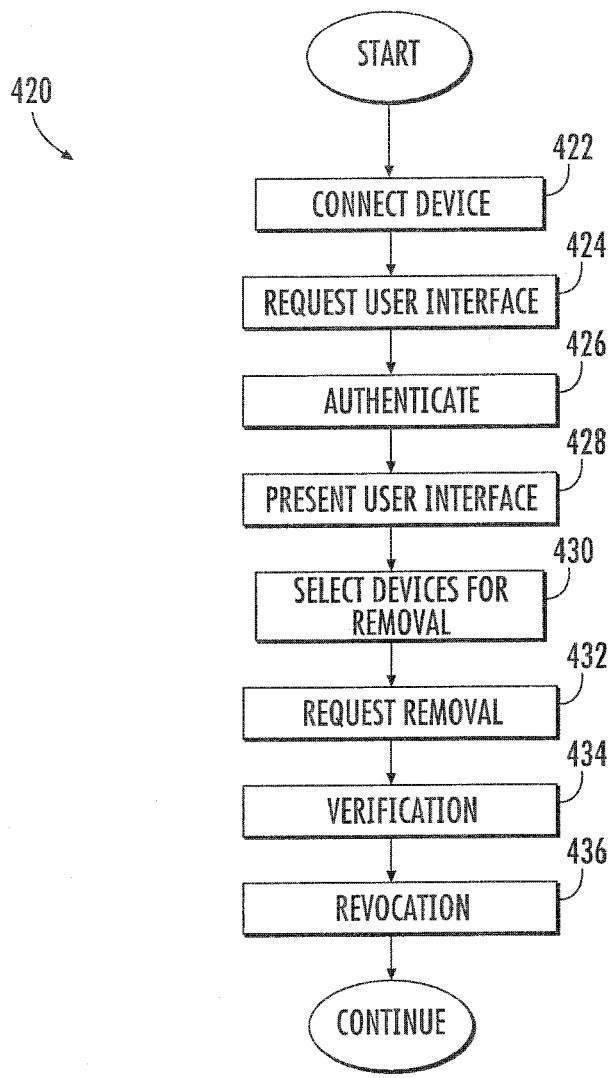
FIG. 4b is a logical flow diagram illustrating a second embodiment of the method for revoking authorization of a device in a protected network according to the present invention.

FIG. 4b illustrates another exemplary method 420 for revoking authorization of a client device 106 to access a premises network. Per step 422, a device 106 is connected to the home network. The device 106, at step 424, requests access to a user interface for providing data and/or content. In response to the request, the device is authenticated at step 426. The authentication step 426 may, as discussed above with respect to FIG. 3a, comprise determining (at the authorization manager 200) whether the requesting device 106 is on a white list 203. Alternatively, as discussed above with respect to FIG. 3b, the device may be authenticated 426 by enabling the user of the device 106 to enter identification information and subscriber information for verification at the manager 200.

An authenticated user device 106 is presented with a user interface for accessing data and/or content (step 428). In one embodiment, the user interface may further provide the authenticated user with a user page enabling the user to revoke devices that have shown up on the subscriber premises network and have attempted to receive services without a subscription (e.g., theft of services or fraud). In one variant, the user is presented with information regarding the types of devices currently present on the user's premises white list, such as by decoding the MAC address. Any device that attempts to access network resources discovers the services using the Simple Service Discovery Protocol (SSDP) that is defined in UPnP. As part of the SSDP the device must provide a device description. This device description is provided to the users as discussed above, thereby enabling the user to determine inappropriate devices.

At step 430, via the user interface, the user may select devices for removal from the user's premises network, and, per step 432, send a request that the selected devices be removed from the network.

At step 434, the authorization manager 200 verifies the revocation request. In one embodiment, the requesting device 106 may be verified by utilizing information identifying the requesting device as an authorized device of the premises. Additional security features may be utilized to ensure that the revocation is being made by an authorized user. For example, revocation may require entry of a password, personal identification number, provision of a digital certificate, etc. either at the device 106 or via other mechanism.

Once the request is verified, the identified device's access to the network is revoked (step 436). In one embodiment, this includes listing the device on a black list 201 as a disapproved device.

Authorization Manager—

Figure 5:
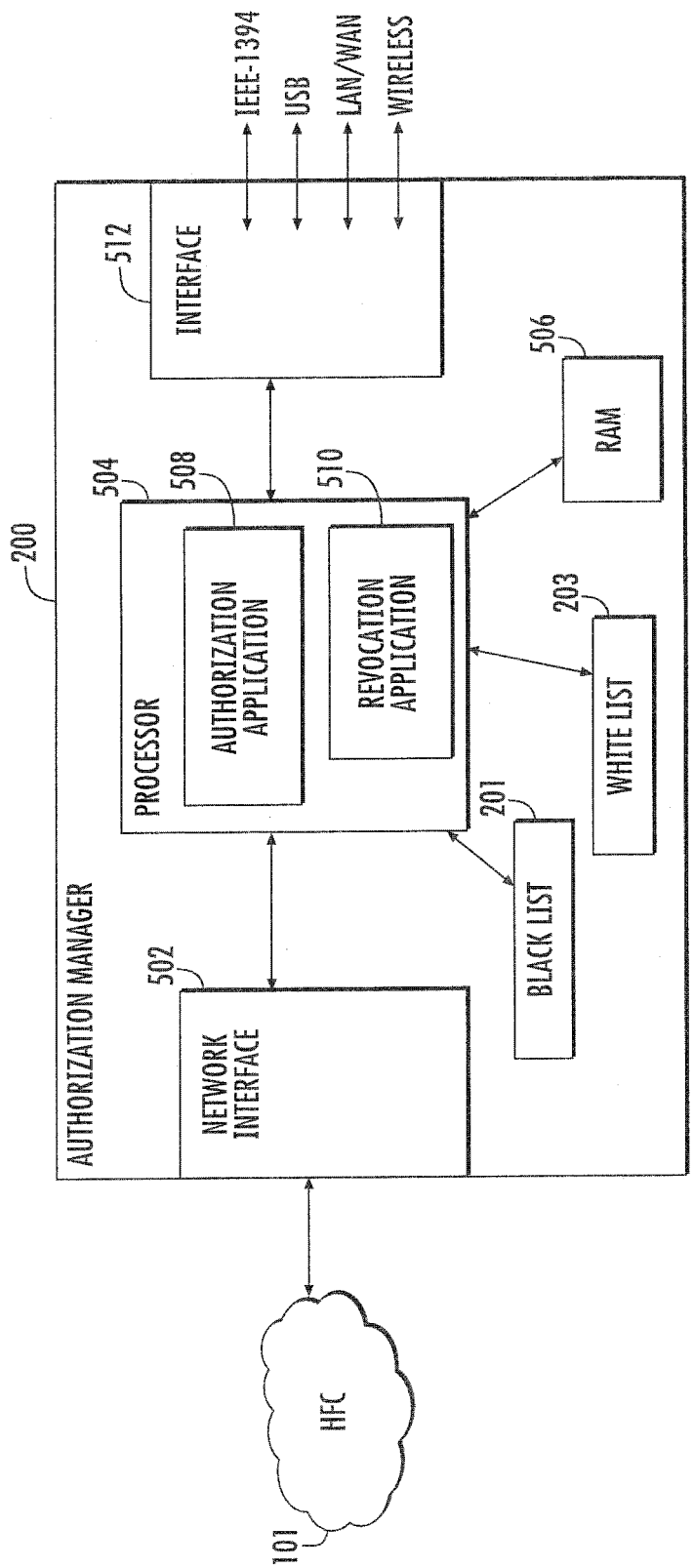
FIG. 5 is a functional block diagram of one embodiment of an authorization manager for use in the present invention.

Referring now to FIG. 5, an exemplary authorization manager (AM) 200 is shown and described. In the illustrated embodiment, the authorization manager 200 is disposed at the CPS 202 and generally comprises a network interface 502 for communication with the HFC network 101, a processor 504 and associated RAM 506, as well as additional interfaces 512 for communication with other headend 150 entities.

The processor 504 is configured to run both an authorization application 508 and a revocation application 510 thereon. The processor 504 is further configured to communicate with a black list 201 and white list 203 stored at the authorization manager 200. However, as previously noted, it will be appreciated that the white list 203 and black list 201 may be disposed remote to the authorization manager 200 (e.g., on a third party device, at the client device, etc.), the manager 200 being in communication with these via at least one of the interfaces 512.

The authorization application 508, in one embodiment, comprises a computer program which when executed, is able to receive a request for access to a network premises, and extract identification information from the request in order to determine whether the requesting device 106 is authorized to access the network. The request may include for example information identifying the device 106 (such as MAC address, IP address, etc.) as well as information identifying the premises (such as subscriber account number, physical address, etc.) to which the device 106 is requesting access. Different and/or additional information may be utilized as needed by the authorization application 508. The authorization application 508 uses the information obtained from the request to search the white list 203 and black list 201 for the CPE 106. As noted previously, a CPE 106 identified on the black list 201 is denied access to a premises network, whereas a CPE 106 on the white list 203 is allowed to access content/data via the premises network.

Furthermore, if the device 106 cannot be found on either the white list 203 or the black list 201, the authorization application 508 may be further configured to enable a user to establish the device 106 as authorized. For example, the authorization application 508 may transmit a series of messages to the device 106 requesting subscriber-specific information (such as a password, personal identification number, telephone number, etc.). The subscriber-specific information obtained from user is then verified against pre-stored subscriber-specific information (either stored at the manager 200, or an entity in communication therewith). If the device 106 can be verified, the authorization application 508 adds it to the white list 203 and grants it permission to access the network.

The revocation application 510, in one embodiment, comprises a computer program which when executed, is able to receive a request to revoke a devices' 106 access to a network premises, extract identification information from the request in order to determine whether the requesting device 106 is authorized to revoke access the network, and subsequently revoke access. The requesting device may be identified by e.g., MAC address, IP address, etc., and the premises may be identified by e.g., subscriber account number, physical address, IP address of a CPD, gateway, etc. (which are extracted from the revocation request). The device to be revoked may also be identified by MAC address, cryptographic hash or signature, IP address, etc. The revocation application 510 may be configured to determine whether a requesting device 106 is authorized to revoke another device's 106 access to the premises network by transmitting a series of messages to the requesting device 106 seeking subscriber-specific information (such as a password, personal identification number, telephone number, etc.). The subscriber-specific information is then verified against pre-stored subscriber-specific information (either stored at the manager 200, or an entity in communication therewith). If the requesting device 106 can be verified, the revocation application 510 adds the identified device 106 to the black list 201.

If the blacklisted device 106 later requests access to the network, it receives a revocation message.

As will be discussed in greater detail below with respect to FIG. 6a, in yet another embodiment, the authorization manager 200a may simply comprise functionality of the authorization application 508 and/or revocation application 510 running on a processor of the STB 208.

It is appreciated that the authorization manager (AM) 200 may comprise additional components (not shown) and functionality well known to those of ordinary skill in the cable and embedded system fields, and accordingly not described further herein. Moreover, the AM 200 may be rendered entirely in software running on another platform (such as an extant headend server or CPE).

CPE—

Figure 6:
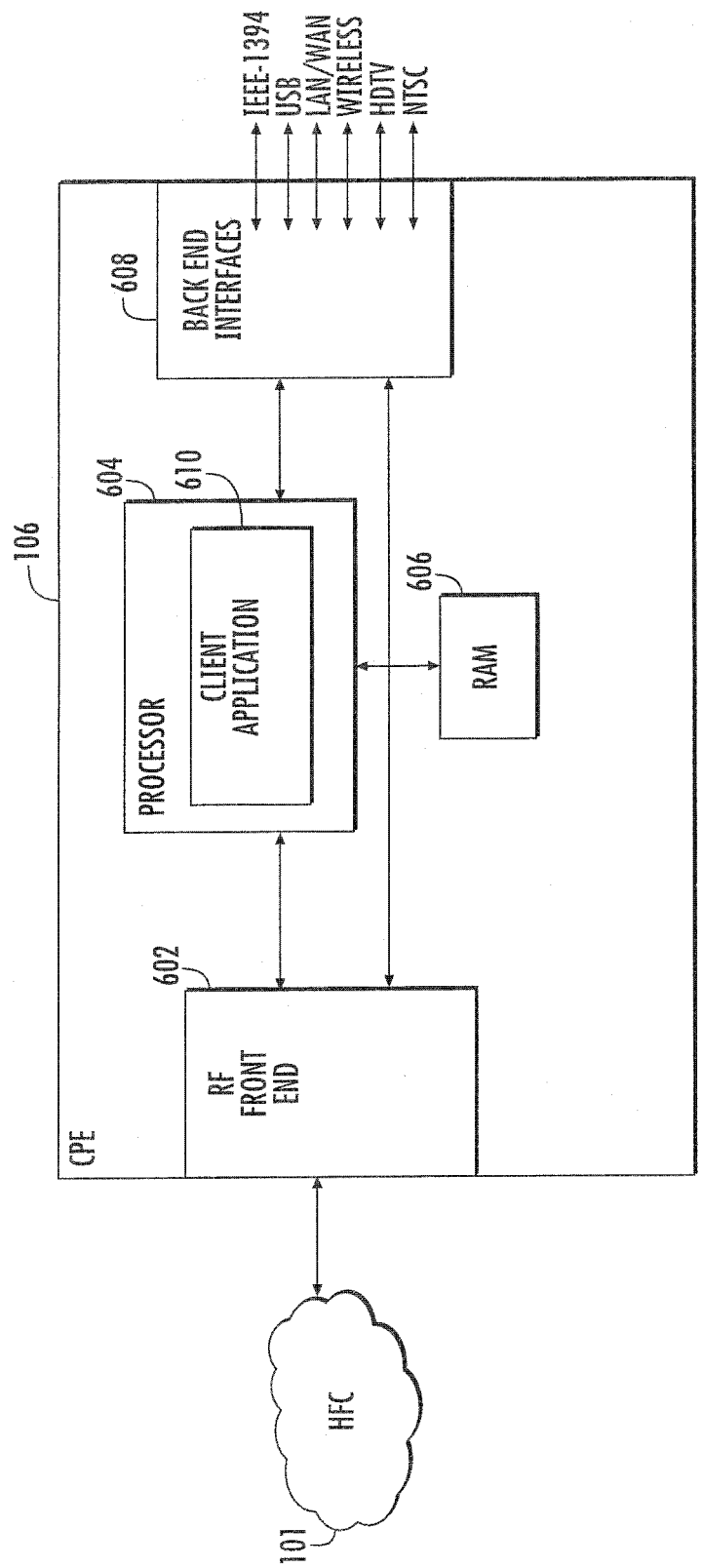
FIG. 6 is a functional block diagram of one embodiment of a premises device for use in the present invention.
Figure 6A:
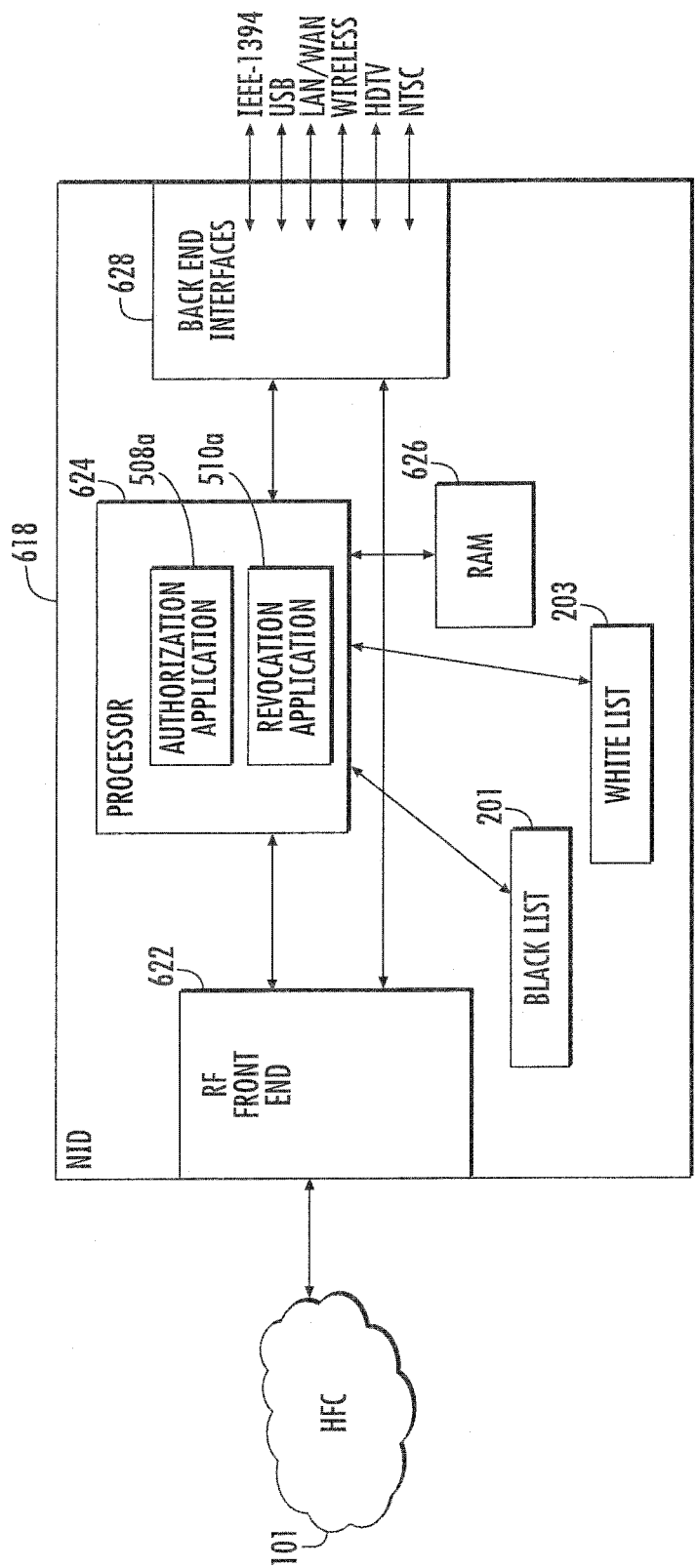
FIG. 6a is a functional block diagram illustrating an exemplary NID for use in the present invention.

An exemplary CPE 106 configured according to the present invention is illustrated in FIG. 6. As shown, the CPE generally comprises an OpenCable (OCAP)-compliant embedded system having an RF front end 602 (including tuner and demodulator/decryptors) for interface with the HFC network 101 of FIGS. 1-1d, digital processor(s) 604, storage device 606, and a plurality of interfaces 608 (e.g., video/audio interfaces, IEEE-1394 "FireWire", USB, serial/parallel ports, etc.) for interface with other end-user apparatus such as televisions, personal electronics, computers, Wi-Fi or other network hubs/routers, etc. Other components which may be utilized within the device (deleted from FIG. 6 for simplicity) include various processing layers (e.g., DOCSIS MAC or DAVIC OOB channel, MPEG, etc.) as well as media processors and other specialized SoC or ASIC devices. The CPE 106 may also comprise an integrated HD decoder, thereby relieving any connected monitors or other devices from the requirement of having such a decoder. These additional components and functionality are well known to those of ordinary skill in the cable and embedded system fields, and accordingly not described further herein.

The CPE 106 of FIG. 6 is also provided with an OCAP-compliant application and Java-based middleware which, inter alia, manages the operation of the device and applications running thereon (including the herein described client application 610). It will be recognized by those of ordinary skill that myriad different device and software architectures may be used consistent with the access control functions of the present invention, the device of FIG. 6 being merely exemplary. For example, different middlewares (e.g., MHP, ARIB, or ACAP) may be used in place of the OCAP middleware of the illustrated embodiment.

The exemplary CPE 106 further comprises a conventional "Watch TV" application or the like, which services those program or user channels available over the network. The Watch TV application, residing in memory, provides such functions as channel navigation control, channel selection in response to a channel change event, etc.

As previously noted, the CPE 106 of FIG. 6 includes a client application 610 which is configured to detect a premises network, and request access to the network by sending a request message to an authorization manager 200, 200a. In one embodiment, the client application 610 may transmit one or more request messages indicating the identity of the requesting CPE 106 (and the premises network to which access is requested). The client application 610 may be further adapted to enable the aforementioned user interface to be displayed on a display device associated with the CPE 106 once access thereto has been granted. The client application 610 may further facilitate navigation within the user interface, such as for enabling a user to receive data/content, and/or to enable a user to view other devices on the premises network, as well as to select and remove unauthorized devices.

In yet another embodiment, the client application 610 is further configured to receive revocation/confirmation messages, such as when the device 106 has been removed from a premises network (e.g., blacklisted).

The CPE 106 may further receive channel content over in-band frequencies, and Internet content over DOCSIS frequencies. This can be accomplished via, e.g., use of a wideband tuner, use of multiple tuners, etc. For example, in one embodiment, the CPE 106 comprises an RF front end including two tuners adapted to tune to prescribed in-band and DOCSIS QAMs respectively, delivered over the network 101. A wideband tuner arrangement such as that described in co-owned and co-pending U.S. patent application Ser. No. 11/013,671 entitled "Method and Apparatus for Wideband Distribution of Content" filed Dec. 15, 2004 and incorporated herein by reference in its entirety, may also be utilized, such as where the content associated with one or more program streams (or DOCSIS data streams) is distributed across two or more QAMs.

As noted previously, the CPE 106 may also be configured to transmit and/or receive data via a WiMAX transport. In the context of the present invention for example, the CPE 106 might transmit request messages destined for the authorization manager 200, 200a of the CPS 202 via the WiMAX broadband interface, with delivery of the requested content (e.g., access to a user interface for providing content) being via in-band RF QAMs. Various permutations of the foregoing will be recognized by those of ordinary skill given the present disclosure.

It will be noted that the foregoing description is merely exemplary in nature, and that other CPE 106 configurations may be utilized consistent with the present invention.

Network Interface Device—

In yet another embodiment, the CPE 106 may comprise a Network Interface Device (NID), gateway, or converged premises device (CPD) having a plurality of additional CPE 106 in communication therewith. An exemplary NID 618 is illustrated in FIG. 6a. As shown, the NID 618 generally comprises an interface 622 for communication with a cable network 101, a processor 624 with associated RAM 626, and a plurality of back end interfaces 628 for communication with other CPE 106 (e.g., STBs, DVRs, portable wireless devices, etc.) in a premises. Other components which may be utilized within the device (deleted from FIG. 6a for simplicity) include various processing layers (e.g., DOCSIS MAC or DAVIC OOB channel, MPEG, etc.) as well as media processors and other specialized SoC or ASIC devices. For example, the NID 618 may include a Wi-Fi interface, PAN (personal area networking) wireless interface, video interface, "Plug n' Play" (PnP) interface, an Ethernet interface, HDMI, and/or a plain old telephone service (POTS)/public switched telephone network (PSTN) interface.

The illustrated NID 618 can assume literally any discrete form factor, including those adapted for desktop, floor-standing, or wall-mounted use, or alternatively may be integrated in whole or part (e.g., on a common functional basis) with other devices if desired (or vice versa).

The processor 624 of the NID 618 is adapted to run an authorization application 508a and a revocation application 510a thereon; the applications 508a, 510a are similar in function to the applications 508, 510 discussed above with respect to FIGS. 5 and 6. The processor 624 is further in data communication with the black list 201 and the white list 203. As discussed above, the authorization application 508a authenticates devices 106 requesting access to the premises network, while the revocation application 510a provides a mechanism for ensuring that unauthorized devices do not gain access to the premises network.

In another embodiment, the ND 618 is a converged premises device (CPD) such as is described in co-owned, co-pending U.S. patent application Ser. No. 11/378,129 filed Mar. 16, 2006 and entitled "Methods and Apparatus for Centralized Content and Data Delivery", published as U.S. Patent Publication No. 2007/0217436, previously incorporated herein.

The NID 618 may also implement a home Local Area Network (LAN) utilizing e.g., the existing coaxial cable in the home. For example, an Ethernet-over-coax based technology allows services to be delivered to other devices in the home utilizing a frequency outside (e.g., above) the traditional cable service delivery frequencies. The ND 618 is then able to deliver data and content stored thereon (whether received from the cable or satellite network headend or individual ones of CPE 106 in communication therewith) to the various CPE 106 within the premises. The data and/or content may be protected content having one or more rules associated with its playback, or may be personal content created on a content rendering device.

The NID 618 may also include a MoCA, retail compliant F-connector for providing data over coax capability. The MoCA frequencies can be multiplexed onto the cable input port of the NM 618, or sent over another channel (e.g., dedicated channel or interface).

In yet another embodiment, the NID 618 comprises a premises gateway device such as that disclosed in co-owned, co-pending U.S. patent application Ser. No. 11/818,236 entitled "Premises gateway apparatus and methods for use in a content delivery network" and filed Jun. 13, 2007, now published as U.S. Patent Publication No. 2008/0313691, which is incorporated herein by reference in its entirety. As discussed therein, the CPE 106 may act as a unified communications (e.g., OOB) interface or proxy for other components within the premises network or coupled thereto and/or may be modified to create an authorized service domain (ASD) or trusted domain (TD) for the connected CPE 106.

The NID 618 may in one further embodiment be configured to transmit and/or receive data via the aforementioned WiMAX transport. In the context of the present invention for example, the NID 618 might receive premises network access requests via the WiMAX broadband interface, with access to the user interface for providing content being delivered via in-band RF QAMs. Various permutations of the foregoing will be recognized by those of ordinary skill given the present disclosure.

It will be noted that the foregoing description is merely exemplary in nature and that other NID 618 configurations may be utilized with the present invention.

Password Provision—

The authorization of a device may further comprise provision of a password or other security feature for entering the premises network as discussed in co-owned, co-pending U.S. patent application Ser. No. 12/611,041 filed contemporaneously herewith and entitled "Protected Premises Network Apparatus and Methods" and incorporated herein by reference in its entirety. As discussed therein, in one embodiment, once a device has been registered to or is found on a white list 203, a premises password or an entitlement message may be delivered to the device in order for the device to join the premises network and begin sharing content and data between devices on the network (e.g., MoCA network). The password may be created based at least in part on information identifying the premises network.

In a further embodiment, the network topology illustrated in FIG. 2c may be utilized, wherein the NID 618 comprises a gateway apparatus. According to this embodiment, a network access password may be delivered to the NID 618 after or concurrent with authorization of the NID 618 as is disclosed in the above-referenced co-owned, co-pending application.

Business Models and Rules Engine—

In another aspect of the invention, the aforementioned apparatus and methods can be used as the basis for one or more business models.

For example, in one embodiment, the network operator (e.g., MSO of a cable network) can use the provision of authorization to a premises network and/or premises networking capabilities described herein as a basis for obtaining additional consideration from subscribers and/or content providers or advertisers.

For example, the MSO might offer the capability to add n different devices as part of a "basic" subscriber package, and then charge additional for one or more added devices (or offer such additional devices as an incentive, promotion, or part of a "premium" package of services).

Moreover, the MSO can leverage their advertising revenue with prospective advertisers or other content sources in that added devices on the network ostensibly may translate to additional "impressions" or uses of the content. For example, an advertiser may achieve in impressions of a given advertisement when delivered via a linear broadcast; however, as more devices are added to a premises network associated with a given subscriber account, the number of impressions for that account may increase (e.g., by some additional number of impressions (e.g., m+q), or by some factor (e.g., mr)), in that the additional devices represent additional opportunities for primary content (e.g., movies, videos, TV shows, etc.) to be viewed by members of the premises, and accordingly any advertisements associated therewith.

The amount of consideration (whether between MSO and subscriber, or MSO and advertiser/content provider) may be based on the number of devices on a particular premises network, the data and/or content exchange capabilities within the premises network, or other factors. The MSO may, for example, limit the number of connected retail devices in a premise (versus MSO leased devices), and/or enable the purchase of addition outlets therefrom.

As another option, the MSO or another entity can sell or provide services that are licensed on a per-dwelling or per-unit basis, somewhat akin to prior art software "site" licensing approaches. Such an approach is also advantageously expandable, such as when more DVRs, PCs, STBs, etc. are added to a particular premises or installation.

In another aspect of the invention, a processing entity rendered as one or more computer programs disposed on a headend server or entity (e.g., authorization manager 200, server 206, BSA hub entity, CPE 106, NID 618, or other location) includes a so-called "rules" engine. This engine comprises, in an exemplary embodiment, one or more software routines adapted to control the operation of the premises network in order to achieve one or more goals relating to operations or business (e.g., profit). Included within these areas are network optimization and reliability goals, increased maintenance intervals, increased subscriber or user satisfaction, increased subscription base, higher profit (e.g., from increased advertising revenues, more subscriber "views" of given content, higher data download speed, increased bandwidth and responsiveness to changing demands for bandwidth, reduction of undue QAM replication, and so forth).

These rules may comprise a separate entity or process, and may also be fully integrated within other processing entities, and controlled via e.g., a GUI on a PC connected to the relevant CPE or server. In effect, the rules engine comprises a supervisory entity which monitors and selectively controls CPE and premises network operation processes at a higher level, so as to implement desired operational or business rules. The rules engine can be considered an overlay of sorts to the more fundamental algorithms used to accomplish required distribution and/or premises network operation, such as MoCA network administration, IP address assignment, statistical multiplexing, BSA switching, and so forth.

For example, the network(s) may invoke certain operational protocols or decision processes based on information or requests received from the gateway or CPE, conditions existing within the network(s), demographic data, geographic data, etc. However, these processes may not always be compatible with higher level business or operational goals, such as maximizing profit or system reliability. Hence, when imposed, the business/operational rules can be used to dynamically (or manually) control the operation of the client process on the CPE, gateway, or other devices within the premises. The rules may be, e.g., operational or business-oriented in nature, and may also be applied selectively in terms of time of day, duration, specific local areas, or even at the individual user or device level (e.g., via specific identification of a device via TUNER_ID, MAC address, or the like).

For example, one rule implemented by the rules engine may comprise only providing premises network access and/or certain networking capabilities to certain subscribers or classes of subscribers. The subscriber CPE 106 or STB 208 may possess a MoCA compliant interface, for example, but premises networking utilizing MoCA would not be made available to such subscribers unless they met certain criteria (e.g., "premium" subscription, etc.). Similarly, if the subscriber did not possess a required codec, CA keys, or network interface, the download of this missing component could be controlled to only subscribers meeting certain criteria.

Many other approaches and combinations of various operational and business paradigms are envisaged consistent with the invention, as will be recognized by those of ordinary skill when provided this disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method of providing access to a premises network disposed within a user's premises, the method comprising:
   receiving an address configured to identify at least one client device and a subscriber account number configured to identify at least one premises network to which said at least one client device is connected;
   updating one or more lists of devices to add thereto said address and said account number;
   receiving a request for access to said at least one premises network from said at least one client device; and
   in response to said request, granting or denying access to said at least one premises network to said at least one client device.

2. The method of claim 1, wherein said address identifying said at least one client device comprises a Media Access Control (MAC) address associated with said at least one client device.

3. The method of claim 2, wherein said request comprises at least said MAC address associated with said at least one client device and said subscriber account number.

4. The method of claim 1, wherein said one or more lists comprises at least a white list of authorized devices, and a black list of unauthorized devices.

5. The method of claim 4, further comprising searching said white list and said black list using at least said address configured to identify said at least one client device and said at least one premises network.

6. The method of claim 5, wherein said act of granting or denying access is based at least in part on whether said at least one client device is found on said white or said black list.

7. The method of claim 4, wherein said act of updating further comprises apprising at least one headend billing entity of an addition of said at least one client device to said white list of authorized devices for said at least one premises network.

8. The method of claim 7, further comprising verifying said address configured to identify said at least one client device and said at least one premises network, said verifying comprising comparing said address configured to identify said at least one client device and said at least one premises network with subscriber information stored at said at least one headend billing entity.

9. The method of claim 1, wherein said act of granting access to said at least one premises network comprises presenting said at least one client device with a user interface for accessing data and content.

10. The method of claim 9, wherein said user interface for accessing data and content comprises an electronic programming guide (EPG).

11. The method of claim 1, wherein said act of denying access to said at least one premises network comprises presenting said at least one client device a message indicating a reason for said denial of access.

12. The method of claim 1, wherein said premises network comprises a Multimedia over Coax Alliance (MoCA)-compliant home network.

13. Consumer premises equipment (CPE) for providing access to a premises network with a plurality of client devices connected thereto, said CPE comprising:
   an interface to a content delivery network disposed substantially off the user's premises;
   at least one back-end interface;
   a storage apparatus configured to store a first list of authorized ones of said plurality of client devices identified by an address or subscriber account number thereof, and a second list of unauthorized ones of said plurality of client devices identified by an address or subscriber account number thereof; and
   at least one processing entity configured to run at least one program thereon, said program comprising a plurality of instructions configured to, when executed:
      receive a request for access from one of said plurality of client devices;
      evaluate said first and second lists to determine whether said one of said plurality of client devices is authorized to access said premises network;
      when said one of said plurality of client devices is authorized to access said premises network, grant access thereto; and
      when said one of said plurality of client devices is not authorized to access said premises network, deny access thereto.

14. The CPE of claim 13, wherein said at least one back end interface comprises an interface to said plurality of client devices in said premises network.

15. The CPE of claim 13, wherein said plurality of instructions are further configured to, when executed search said first and second lists for said address or subscriber account number corresponding to said individual one of said plurality of client devices, said search being used to determine whether said one of said plurality of client devices is authorized to access said premises network.

16. The CPE of claim 15, wherein:
   when said address or subscriber account number corresponding to said one of said plurality of client devices is not present in any of said first and second lists, said plurality of instructions further configured to, when executed,
   add said address or subscriber account number corresponding to said one of said plurality of client devices to said second list.

17. The CPE of claim 13, wherein said at least one program comprises a distributed application having at least one component thereof configured to run at a headend entity of said content delivery network.

18. The CPE of claim 13, wherein said interface to said content delivery network comprises a radio frequency (RF) interface, and said premises network comprises a Multimedia over Coax Alliance (MoCA)-compliant premises network.

19. A computer readable apparatus comprising a plurality of instructions configured to provide access to a premises network, said premises network having a plurality of client devices connected thereto, said plurality of instructions configured to, when executed on a processing apparatus:
   store one or more lists of authorization information at an entity of said premises network, said authorization information comprising an address or subscriber account number associated to individual ones of said plurality of client devices;
   receive a request for access to said premises network from one of said plurality of client devices, said request comprising said address or subscriber account number associated to said one of said plurality of client devices and said premises network;
   determine whether said one of said plurality of client devices is authorized to access said premises network based at least in part on an evaluation of said address or subscriber account number with respect to said one or more lists;
   when it is determined that said one of said plurality of client devices is authorized to access said premises network, grant access thereto; and when it is determined that said one of said plurality of client devices is not authorized to access said premises network, deny access thereto.

20. The apparatus of claim 19, wherein said one or more lists of said authorization information each comprises information indicating whether said individual ones of said plurality of client devices are authorized or not authorized to access said premises network.

21. The apparatus of claim 19, further comprising a distributed application having at least one component thereof configured to run at a headend entity of a content delivery network in communication with said premises network.

22. The apparatus of claim 21, wherein said communication to said content delivery network occurs via a radio frequency (RF) interface at said premises network, and said premises network comprises a Multimedia over Coax Alliance (MoCA) compliant premises network.

23. The apparatus of claim 19, wherein said authorization information comprises a Media Access Control (MAC) address associated with said one of said plurality of client devices.

24. The apparatus of claim 19, wherein said access to said premises network is granted occurs via delivery of a user interface configured to enable access to data and content to said one of said plurality of client devices.

* * * * *